United States Patent [19]
Zifferer et al.

[11] Patent Number: 5,267,145
[45] Date of Patent: Nov. 30, 1993

[54] METHOD AND APPARATUS FOR PROGRAM NAVIGATION AND EDITING FOR LADDER LOGIC PROGRAMS BY DETERMINING WHICH INSTRUCTIONS REFERENCE A SELECTED DATA ELEMENT ADDRESS

[75] Inventors: Scott C. Zifferer, Mequon; Joseph J. Menter, Jr., Milwaukee, both of Wis.

[73] Assignee: ICOM, Inc., West Allis, Wis.

[21] Appl. No.: 837,674

[22] Filed: Feb. 14, 1992

Related U.S. Application Data

[63] Continuation of Ser. No. 375,059, Jun. 30, 1989, abandoned.

[51] Int. Cl.$^5$ ............................................. G06F 15/46
[52] U.S. Cl. ................................... 364/191; 364/192; 364/DIG. 1; 364/280.7; 364/286.3; 371/19; 395/155; 395/919; 395/922
[58] Field of Search ............... 364/DIG. 1, DIG. 2, 364/138, 191, 192, 193, 198; 371/19; 395/700, 155, 919, 922

[56] References Cited

U.S. PATENT DOCUMENTS

| | | | |
|---|---|---|---|
| 3,676,851 | 7/1972 | Eastman | 395/575 |
| 3,686,639 | 8/1972 | Fletcher et al. | 395/500 |
| 3,813,649 | 5/1974 | Struger et al. | 395/275 |
| 3,964,026 | 6/1976 | Yamauchi et al. | 395/141 |
| 4,038,533 | 7/1977 | Dummermuth et al. | 364/136 |
| 4,200,914 | 4/1980 | Kintner | 364/147 |
| 4,227,247 | 10/1980 | Kintner | 364/147 |
| 4,244,034 | 1/1981 | Cherba | 364/147 |
| 4,247,901 | 1/1981 | Martin et al. | 395/775 |
| 4,316,260 | 2/1982 | Hideshima | 364/144 |
| 4,396,974 | 8/1983 | Imazeki et al. | 364/138 |
| 4,415,965 | 11/1983 | Imazeki | 364/136 |
| 4,445,169 | 4/1984 | Wakiti et al. | 364/147 |
| 4,449,180 | 5/1984 | Ohshima et al. | 364/147 |
| 4,455,619 | 6/1984 | Masui et al. | 395/160 |
| 4,486,830 | 12/1984 | Taylor, Jr. et al. | 364/146 |
| 4,488,258 | 12/1984 | Struger et al. | 395/146 |
| 4,504,900 | 3/1985 | Yomogida et al. | 364/140 |
| 4,544,997 | 8/1985 | Furgerson | 364/138 |
| 4,616,307 | 10/1986 | Kusumi et al. | 364/147 |
| 4,635,183 | 1/1987 | Isobe et al. | 364/141 |
| 4,644,478 | 2/1987 | Stephens et al. | 364/550 |
| 4,661,899 | 4/1987 | Usuda | 364/167.01 |
| 4,663,704 | 5/1987 | Jones et al. | 364/188 |
| 4,703,414 | 10/1987 | Inoue et al. | 395/375 |
| 4,815,014 | 3/1989 | Lipner et al. | 364/550 |
| 4,833,592 | 5/1989 | Yamanaka | 364/138 |
| 4,843,538 | 6/1989 | Lane et al. | 364/188 |

OTHER PUBLICATIONS

PLC-5 Ladder Logistics User's Manual, Sep. 1, 1987 Entire Document.
Allen-Bradley Company, Inc. Programming and Operations Manual, Bulletin 1772 ICOM, Inc.
PLC-2 Ladder Logistics User's Manual, Aug. 1987 ICOM, Inc.
PLC-3 Ladder Logistics User's Manual, Sep. 1987 ICOM, Inc.

(List continued on next page.)

*Primary Examiner*—Thomas C. Lee
*Assistant Examiner*—John C. Loomis
*Attorney, Agent, or Firm*—Merchant, Gould, Smith, Edell, Welter & Schmidt

[57] ABSTRACT

The present invention is a method that provides productivity aids for developing, debugging, and troubleshooting ladder logic programs used in Programmable Logic Controllers (PLCs). The present invention discloses methods for searching ladder logic programs of programmable logic controllers for instructions, addresses, and symbols. The user can select an address or symbol in the ladder logic program and display on a computer a cross-reference list for the selected address or symbol. The cross-reference list shows all ladder logic instructions, and their locations in the ladder logic program, that use the selected address or symbol. An instruction location can be selected from the cross-reference list and the corresponding point in the ladder logic program will be displayed on the computer.

32 Claims, 24 Drawing Sheets

OTHER PUBLICATIONS

PLC-5 Ladder Logistics User's Manual, Sep. 1987 Taylor Industrial Software.

Taylor Industrial Software Product Summary, Feb. 1988.

Taylor Industrial Software Product Bulletin #1, Apr. 1987.

Taylor Industrial Software Product Bulletin #21, Apr. 1987.

Taylor Industrial Software Product Bulletin #25, Aug. 1987.

Tele-Denken Resources, Inc. New Product News, Jan. 1986.

Tele-Denken Resources, Inc. TiD Bits, Second Quarter 1988.

Tele-Denken Resources, Inc. TOPDOC Program Development Environment, Nov. 1987.

PLC-5 Ladder Logic User's Manual, 1987 Entire Document.

| Maximum Number of Elements | File Type | File Number | 16-bit Words per Element |
|---|---|---|---|
| 32 | Output Image | 0 | 1 |
| 32 | Input Image | 1 | 1 |
| 32 | Status | 2 | 1 |
| 1000 | Bit | 3 | 1 |
| 1000 | Timer | 4 | 3 |
| 1000 | Counter | 5 | 3 |
| 1000 | Control | 6 | 3 |
| 1000 | Integer | 7 | 1 |
| 1000 | Floating Point | 8 | 2 |
| 1000 | User Assigned | 9-999 | 1 |

Reference numbers: 230, 232, 234, 236, 238, 240, 242, 244, 246, 248

FIG. 24

| IF (Condition) — 250 | Then (Action) — 252 |
|---|---|
| Input Bit 01 is On | Turn Output Bit 01 On |

FIG. 25

METHOD AND APPARATUS FOR PROGRAM NAVIGATION AND EDITING FOR LADDER LOGIC PROGRAMS BY DETERMINING WHICH INSTRUCTIONS REFERENCE A SELECTED DATA ELEMENT ADDRESS

This is a continuation, of application Ser. No. 07.375,059, filed Jun. 30, 1989, which was abandoned upon the filing hereof.

FIELD OF THE INVENTION

This invention relates generally to methods of developing ladder logic programs for Programmable Logic Controllers (PLCs). In particular, is directed to a method of searching for instructions, addresses, and symbols in ladder logic programs.

BACKGROUND OF THE INVENTION

Programmable logic controllers (PLCs) perform many of the control functions for assembly line machines, machine tools, and other types of industrial equipment. For example, a part arriving at a workstation may contact and close a limit switch or other type of sensing device. As a result, an electrical circuit is completed or broken, and a signal is sent to a PLC indicating the change in condition. The PLC responds to the input as directed by a ladder logic program which, to a large degree, simulates the response of what used to be accomplished by older systems with a set of relays and other control devices. Ladder logic programs instruct the PLC how and when to react to the different signals it receives. The PLC, in turn, instructs the devices it controls in an appropriate manner as specified in the ladder logic program.

A PLC is comprised of a processor, memory, input modules, and output modules. FIG. 22 shows a PLC processor 208 and memory 210, wherein the PLC 206 is (optionally) connected 218 to a personal computer 220. Ladder logic programs 214 may be developed on the personal computer 220 and then downloaded to the PLC 206. The PLC processor 208 executes the ladder logic program 214. The memory 210 stores output image tables, input image tables, timer storage, counter storage, and ladder logic program workspace. The input modules connect the PLC to input devices and can receive both digital and analog signals. The output modules connect the PLC to machines or other devices and can transmit either digital or analog signals to control them.

In most PLCs, such as those manufactured by the Allen-Bradley Company, memory is structured into "Data Table files" 230-248 as shown in FIG. 24. The memory may be divided into as many as 1000 different Data Table files 230-248. There are a plurality of different types of Data Table files 230-248, each serving a different purpose. These Data Table files comprise the Input Image 232, Output Image 230, Status 234, Bit 236, Timer 238, Counter 240, Control 242, Integer 244, and Floating Point 246 files.

The Input Image Data Table file 232 maintains the status of inputs to the PLC. A single bit in the Input Image Data Table file 232 represents the status of a single I/O point on an input module. If an input bit is ON, then a signal has been received at the input module. If the input bit is OFF, then no signal has been received at the input module.

The Output Image Data Table file 230 controls the outputs from the PLC. A single bit in the Output Image Data Table file 230 represents the status of a single I/O point on an output module. If an output bit is ON, then the PLC sends a signal to the output module. If the output bit is OFF, then the PLC does not send a signal to the output module.

The Timer Data Table file 238 reflects the status of timers executing in the ladder logic program. Timers keep track of timed intervals according to the ladder logic program. Timers consist of Accumulated Values and Preset Values. The timer intervals are stored in the Timer Accumulators and typically have three bases: (1) 1.0 seconds; (2) 0.1 seconds; and (3) 0.01 seconds. Timer status bits indicate whether the timer is enabled and whether it has timed out.

The Counter Data Table file 240 reflects the status of counters executing in the ladder logic program. Counters accumulate the number of events that occur in a ladder logic program, wherein an event is defined as the transition from a condition of "false" to "true". Counters consist of Accumulated Values and Preset Values. Counter status bits indicate the following: whether the counter has overflowed or underflowed; whether the Accumulator Value is greater than or equal to the Preset Value (i.e., "count complete"); an enable bit for "counter up" instructions; and an enable bit for "counter down" instructions.

The remaining Data Table files, Status 234, Bit 236, Control 242, Integer 244, and Floating Point 246, can perform a number of different functions. The various functions of these Data Table files are not essential to an understanding of the present invention.

The PLC uses addresses to refer to words and bits in the Data Tables files. The addresses allow a ladder logic program to identify Data Table files, elements therein, and bits of the elements. Addresses are generally expressed as "<file type> <file number>: <element>. <subelement>/<bit number>". Thus, the address "B3:10/1" means "Bit file type; File #3; Element #10; Bit #1".

Addresses of elements in the Output Image 230 and Input Image 232 Data Table files are specified in octal format, i.e., 00-07 and 10-17 are valid bit addresses. All of the other file types use decimal addresses for elements. Bit type 236 Data Table files are "wordless". Addresses entered in a "word/bit" format are converted by the software package into a bit-only format. For example, if address B3:10/1 is entered by the user, the software package converts it to B3/161 (10 words × 16 bits/words + 1 bit). The Output Image 230, Input Image 232, and Status 234 files are unique in that their maximum sizes are set by the PLC processor type as shown in FIG. 24. The remaining file types 236-248 may contain a maximum of 1000 elements. File types may be duplicated as needed to allocate storage space. For example, if more timers than the 1000 available in file "T4" are needed, file "T9" can be created. Ideally, the user would assign timers (or other variables) sequentially to conserve memory.

As shown in FIG. 23, the ladder logic program 222 scanned by the processor of the PLC (and used to control the PLC) is a group of statements 224. These statements 224 are often displayed to programmers in a graphical manner comprising ladder diagrams and functional block instructions. Each statement 224, or "rung" of the ladder logic program, consists of at least one condition test 226 and at least one action 228 to be performed when the condition is met. When the condition 226 is met, the rung is "true" and some action 228 is taken, for example, a signal is transmitted, a counter is enabled, a timer is started, etc.

FIG. 25 shows an example "rung". If the input bit 01 has been turned "ON" 250 (i.e., a binary value of "1") by an input device, then the PLC responds by turning output bit 01 "ON" 252 (i.e., a binary value of "1").

The typical PLC is comprised of a number of categories of instructions, including a standard set of arithmetic, logical, move, diagnostic, register, comparison, and data transfer instructions, as would be found in any computer. Program control instructions are also available, allowing the user to structure the ladder logic programs.

In addition to the standard set of instructions, PLCs have a number of special-purpose machine control instructions. Relay-type instructions allow the PLC to monitor and control inputs and outputs for both digital and analog devices. Timer and counter instructions control interval timers and event counters. Sequencer instructions let the PLC monitor and control up to 16 I/O status bits at the same time. Immediate I/O instructions scan critical inputs or set critical outputs prior to normal I/O scans. Control instructions are available to let the PLC perform proportional, integral, and derivative (PID) control of processes and equipment.

In prior art ladder logic development systems, programmers can develop ladder logic programs on-line or off-line from the PLC, communicate with the PLC on-line to monitor the program's status, troubleshoot the ladder logic program, force the status of I/O status bits ON or OFF to simulate events, and perform a number of other functions. However, these prior art development systems offer little in the way of productivity aids for the ladder logic programmer and serve primarily as limited platforms for programming ladder logic.

SUMMARY OF THE INVENTION

To overcome the limitations in the prior art described above, and to overcome other limitations that will become apparent upon reading and understanding the present specification, the present invention discloses methods for searching ladder logic programs of programmable logic controllers for instructions, addresses, and symbols.

The user can select an address or symbol in the ladder logic program and display on a computer a cross-reference list for the selected address or symbol. The cross-reference list shows all ladder logic instructions, and their locations in the ladder logic program, that use the selected address or symbol. An instruction location can be selected from the cross-reference list and the corresponding point in the ladder logic program will be displayed on the computer.

The present invention also discloses a method of searching for a first address or symbol in a ladder logic program and replacing it with a second address or symbol. Only portions of the addresses or symbols need be specified for either searching or replacement.

DESCRIPTION OF THE DRAWINGS

In the drawings, where like numerals refer to like elements throughout the several views.

FIG. 24 is an illustration describing the memory structure of the programmable logic controller;

FIG. 25 is an illustration describing the structure of a ladder logic rung;

DETAILED DESCRIPTION OF THE PREFERRED EMBODIMENT

In the following Detailed Description of the Preferred Embodiment, reference is made to the Drawings which form a part hereof, and in which is shown by way of illustration a specific embodiment in which the invention may be practiced. It is to be understood that other embodiments may be utilized and structural changes may be made without departing from the scope of the present invention.

General Description

The software package embodying the present invention is a menu driven system used to develop ladder logic programs for Programmable Logic Controllers (PLCs). The software package is a programmer's "tool box" for developing ladder logic programs and includes: (1) off-line program development; (2) off-line processor emulation; (3) on-line program development; and (4) on-line station monitoring. Off-line program development provides the user the ability to develop ladder logic programs without connection to a PLC processor. Off-line emulation provides a user the ability to execute and debug ladder programs without the use of a PLC processor. On-line program development provides the user the ability to develop ladder logic programs while being connected to a PLC processor.

Additional information regarding this software package is available in the co-pending and commonly assigned patent applications. Application Ser. No. 07/374,487, now pending. "A METHOD AND APPARATUS FOR SYMBOLIC LADDER LOGIC PROGRAMMING WITH AUTOMATIC ATTACHMENT OF ADDRESSES", by Zifferer et al., application Ser. No. 07/373,920, now pending. "A METHOD AND APPARATUS FOR OFF-LINE EMULATION FOR LADDER LOGIC PROGRAMS", by Zifferer et al., application Ser. No. 07/373,826, now .S. Pat. No. 4,991,076 "A METHOD AND APPARATUS FOR CREATING CUSTOM DISPLAYS FOR MONITORING LADDER LOGIC PROGRAMS", by Zifferer et al., and application Ser. No. 07/375,270, now U.S. Pat. No. 5,127,099 "A METHOD AND APPARATUS FOR SECURING ACCESS TO A LADDER LOGIC PROGRAMMING AND MONITORING SYSTEM", by Zifferer et al., all of which applications were filed on even date herewith, and all of which applications are hereby incorporated by reference.

Cross-Reference Data

Figure 26:
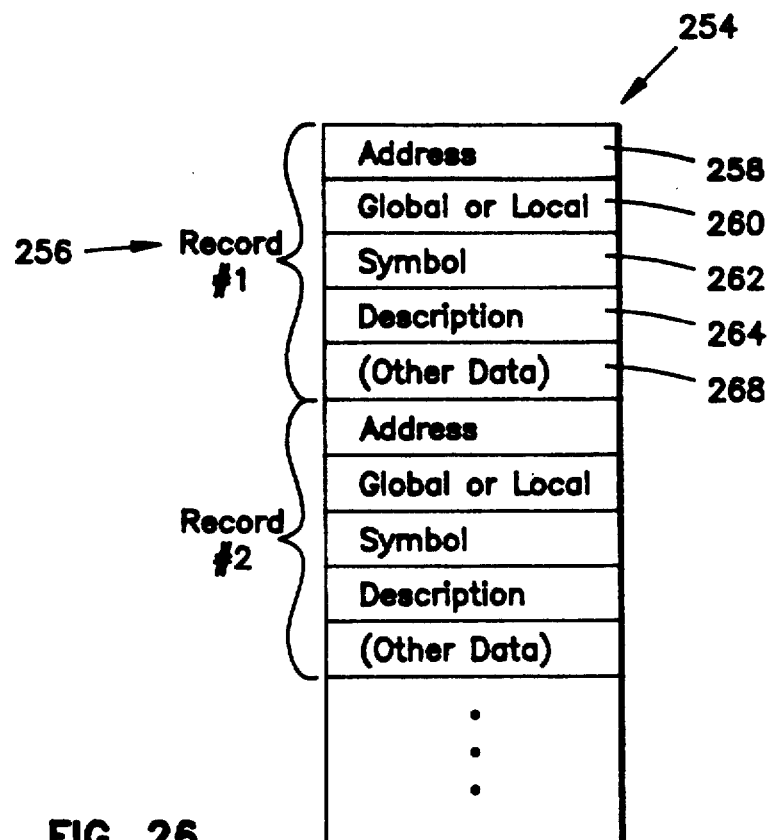
FIG. 26 shows the structure of the attachment file that links symbols and addresses.

FIG. 26 describes a database file 254 that maintains the "attachment" between symbols and addresses. Each record 256 in the attachment file 254 is comprised of the PLC address 258, a global/local identifier 260, a symbol 262, a description of the symbol 264, and other data not related to "attachments" 266. The software package can search the attachment file 254 in two ways: (1) supplying an address 258 and searching the file 254 for the attached symbol 262; or (2) supplying the symbol 262 and searching the file 254 for the attached address 258.

Figure 27:
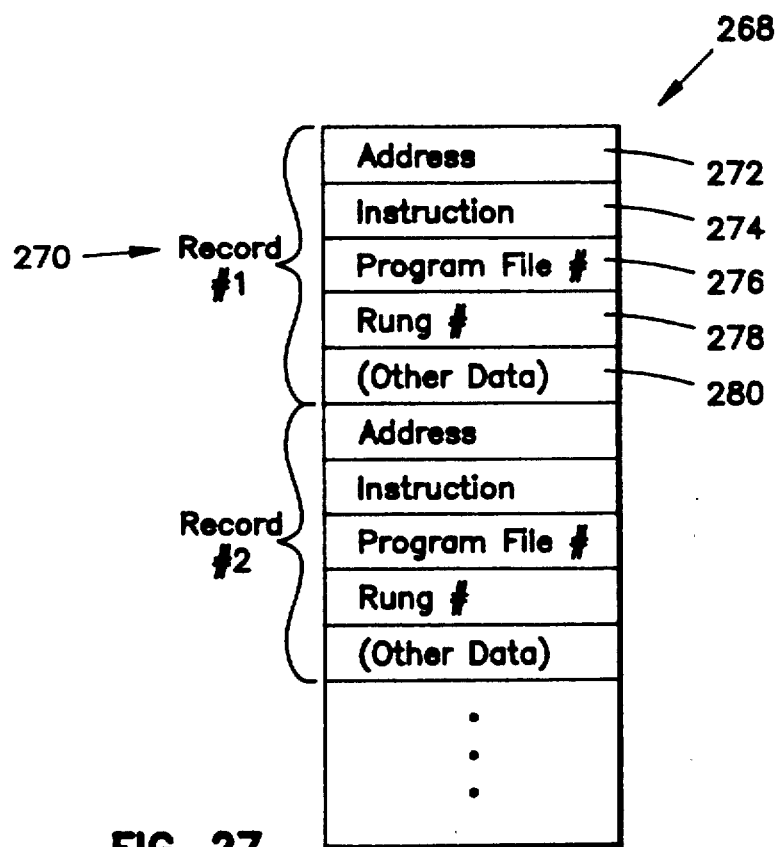
FIG. 27 shows the structure of the cross-reference file that identifies address usage in ladder logic programs.

FIG. 27 describes a database file 268 where the software package maintains cross-reference information for the addresses. Each record 270 in the cross-reference file 268 is comprised of the PLC address 272, an identifier 274 for each instruction that uses the address, a program file number 276 containing the instruction, a rung number 278 in the program file 276 where the instruction is located, and other data 280. The software package can search the cross-reference file 268 in two ways: (1) supplying an address 272 and searching the cross-reference file 268 for the locations 276 and 278 where the address 272 is used; or (2) supplying the symbol 262 and searching the attachment file 254 first for the attached address 258, then, using that address 258, searching the cross-reference file 268 for the locations 276 and 278 where the symbol 262 (i.e., address 272) is used. As the ladder logic programs change, the software package automatically updates the cross-reference information.

Searching

Figure 1:
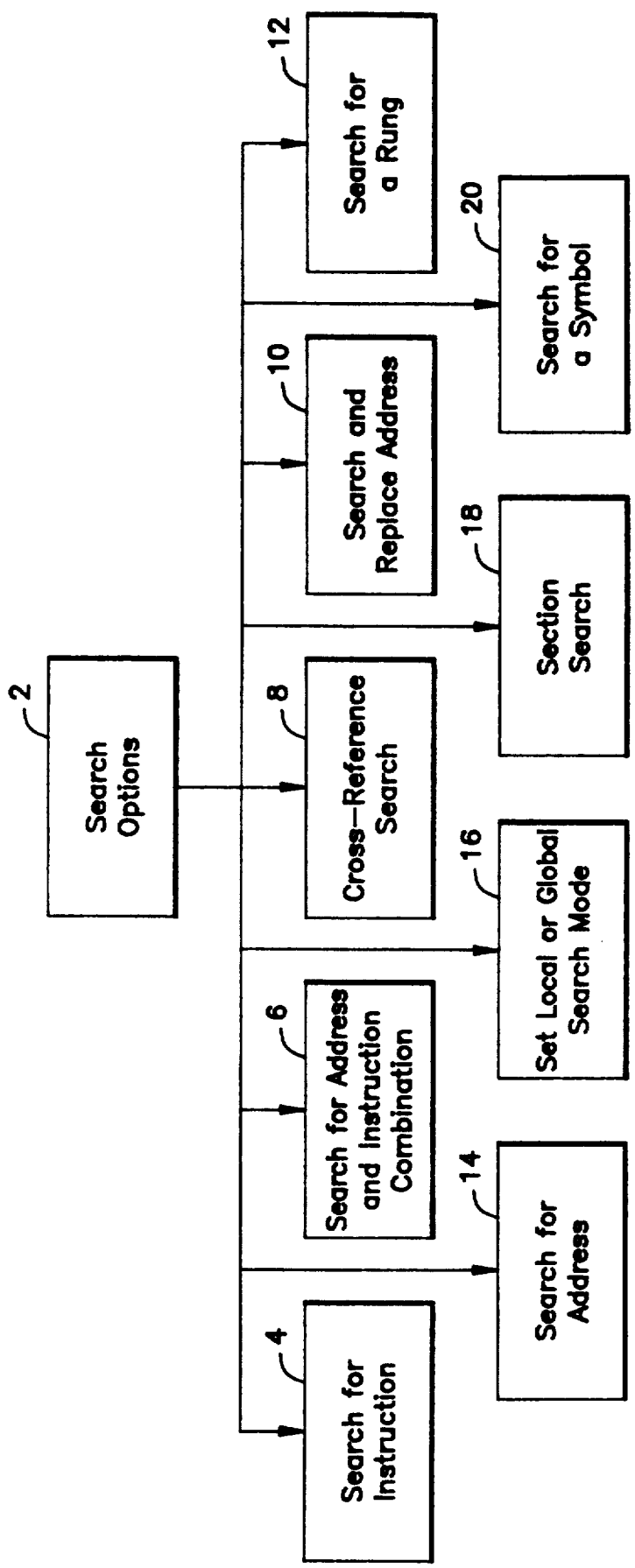
FIG. 1 is a block diagram describing the various search options available in the software package of the present invention.

FIG. 1 is a block diagram describing the search functions 2-20 available in the software package. These functions perform searches on instructions 4, addresses 10 and 14, or a combination of both 6. In addition, the user may search for symbols 8 and 20 or specific rung numbers 12 and 18. The search functions 2-20 help the user quickly locate items in the ladder logic programs.

Figure 3:
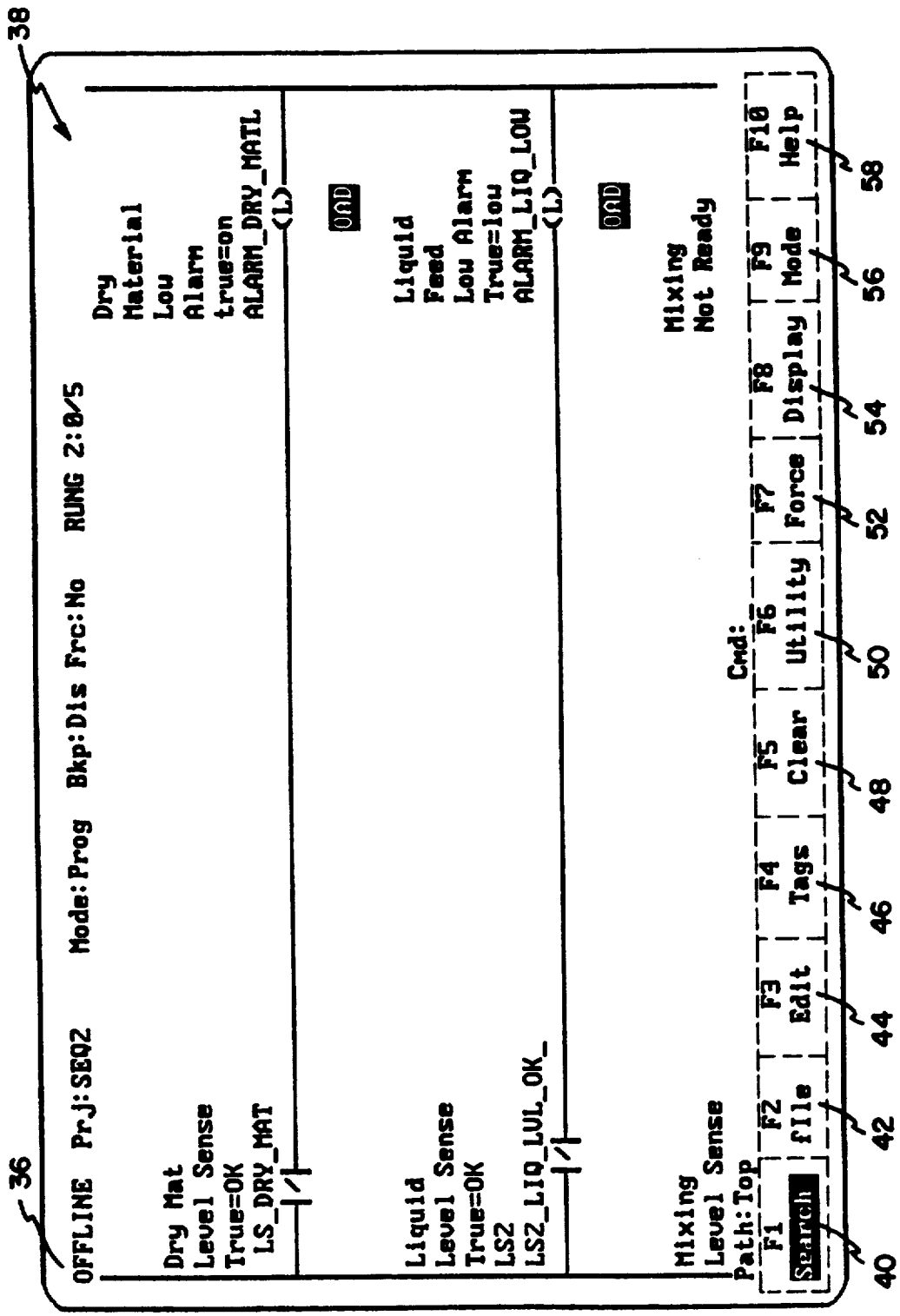
FIG. 3 is a screen displaying a ladder logic program in the software package of the present invention.

FIG. 3 shows a ladder logic program 38 as displayed from a screen 36 in the software package's Off-line programming mode. The search functions described herein are also accessible from the software package's On-line programming mode. The software package provides a number search functions for the user, which are accessible by pressing the F1 (Search) key 40.

Figure 4:
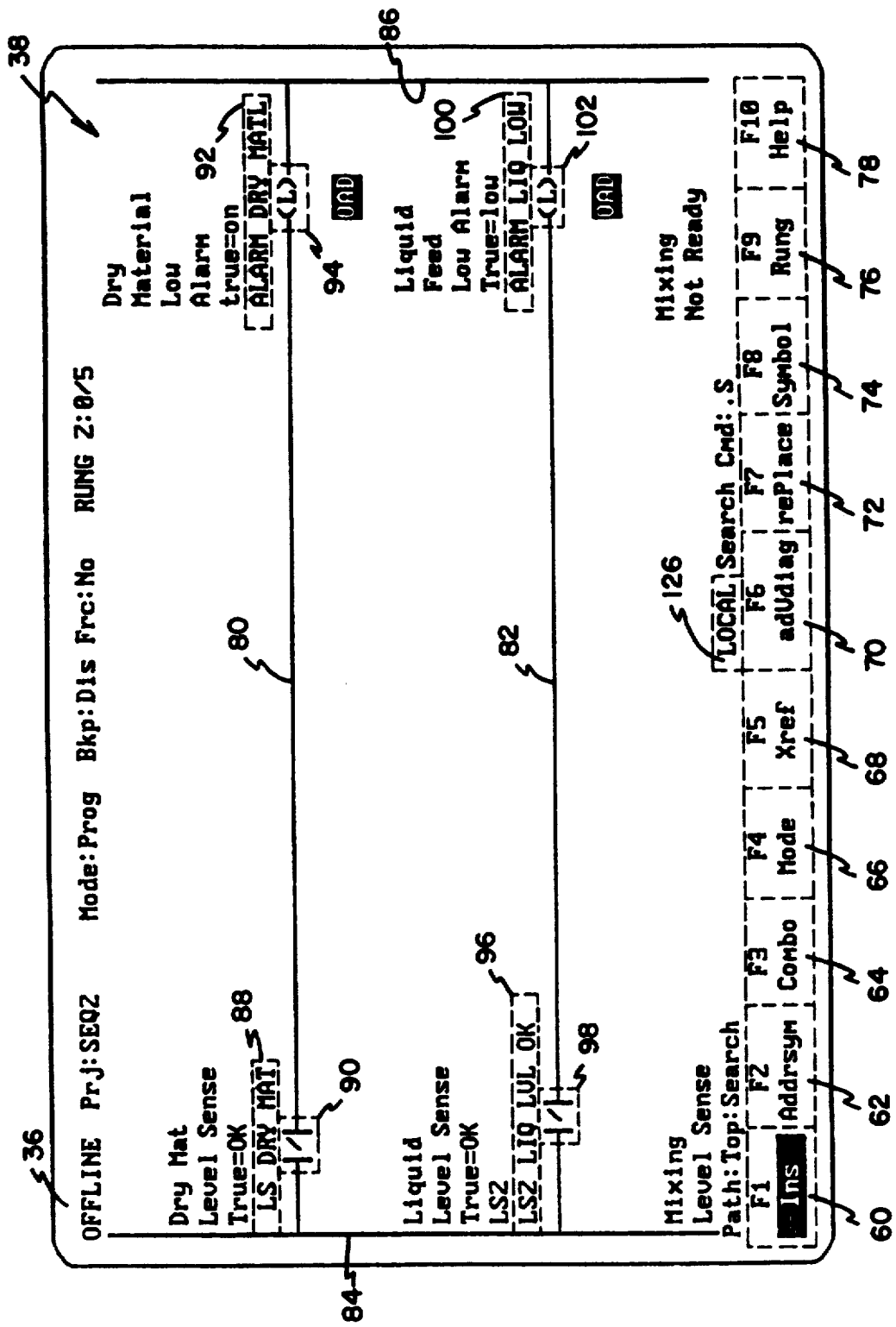
FIG. 4 is a Search screen displayed after the F1 (Search) key is pressed in FIG. 3.

FIG. 4 is a Search screen 36 displayed after the F1 (Search) key 40 was pressed in FIG. 3. Above each function key identifier 60-78 across the bottom of FIG. 4, there is a description of the function performed. When a function key 60-78 is selected by the user, the cursor highlights the particular function description. The selected function is always highlighted on the screen 36. To cancel any function, after the function has been invoked but prior to entering any parameters thereto, the user presses the Escape key.

Search For An Instruction

Figure 5:
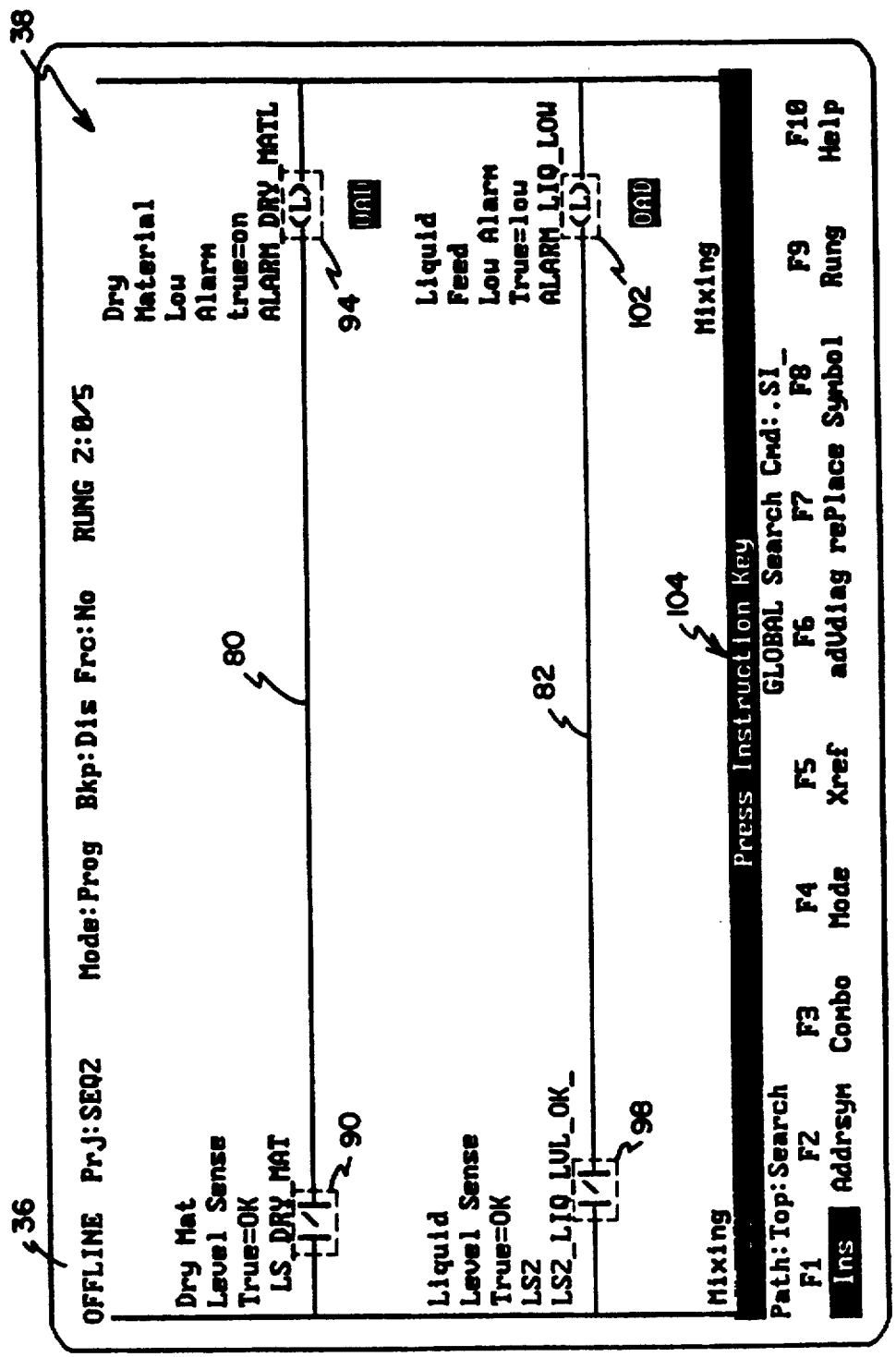
FIG. 5 is an Instruction Search screen displayed after the F1 (Ins) key is pressed in FIG. 4.

This function is invoked by pressing the F1 (Ins) key 60 in FIG. 4. FIG. 5 is then displayed. The user may search for specific instructions in the current working ladder logic program 38 regardless of the address used therewith. The user enters an instruction type at the prompt "Press Instruction Key" 104 . The user enters the instruction type in one of the same three ways that the instruction was first entered into the ladder logic program 38:

1. Pressing the program assignment key (A-Z) assigned to the instruction. For example, the letter "X" may have been assigned to the "XIC" instruction by default. Current key definitions can be reviewed.

2. Entering the three letter mnemonic for the instruction proceeded by a "/", for example, "/XIO".

3. Pressing the function key assigned to the instruction.

Once the instruction is entered, the search operation begins from the current rung position 80 and continues until the desired instruction is found. If the selected instruction does not exist, the search will wrap around the entire ladder logic program 38 and stop at the point of origin 80.

When a match is found, an editing screen 36, such as the one shown in FIG. 4, is displayed wherein the cursor is positioned on the matched item.

Figure 6:
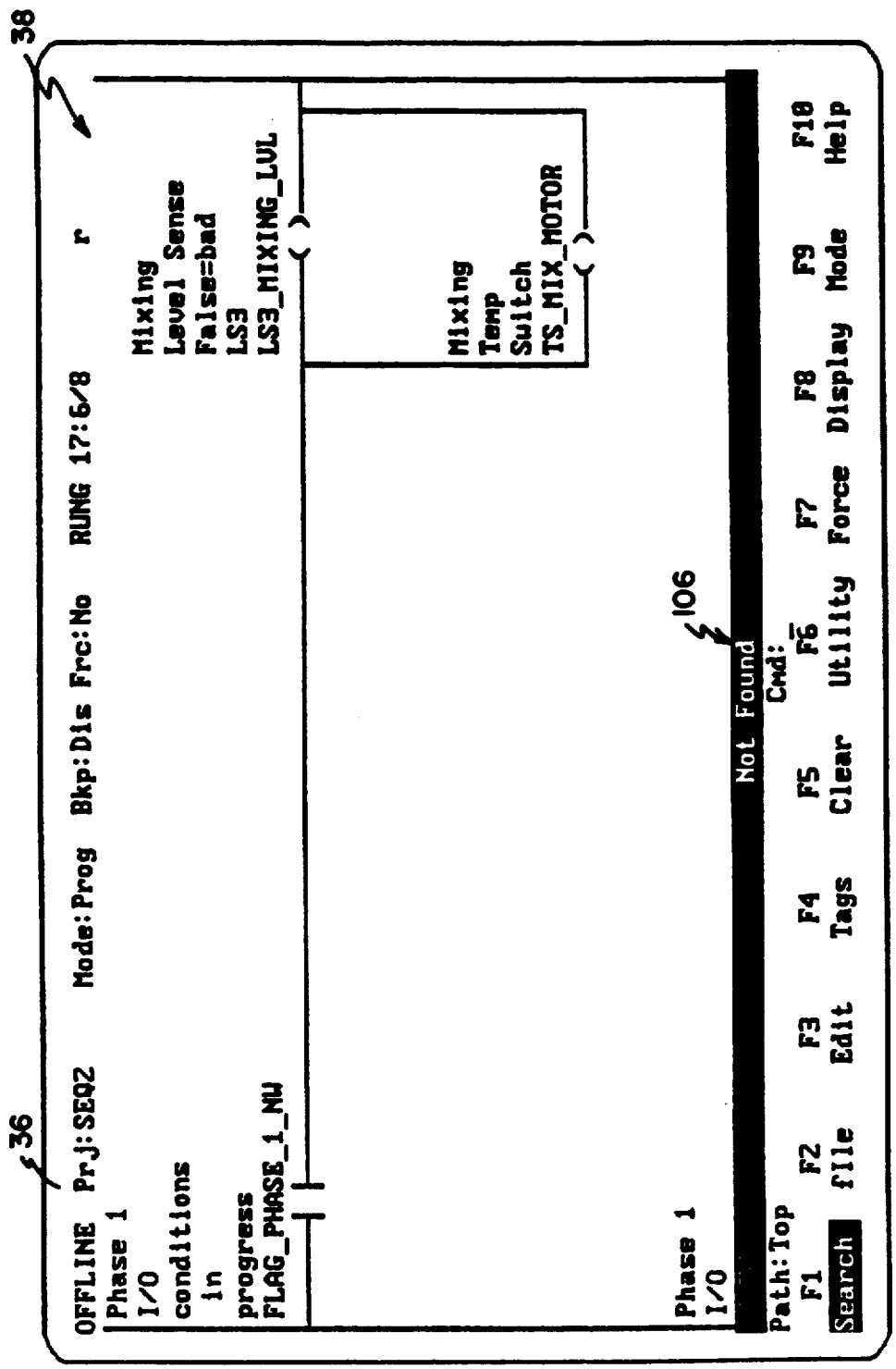
FIG. 6 is a Search screen displayed when no match is found during a search.

To search for additional instructions of the same type, the F1 (Search) key 40 is pressed, until a message "Not Found" 106 is displayed [,] as shown in FIG. 6.

Search For An Address

Figure 7:
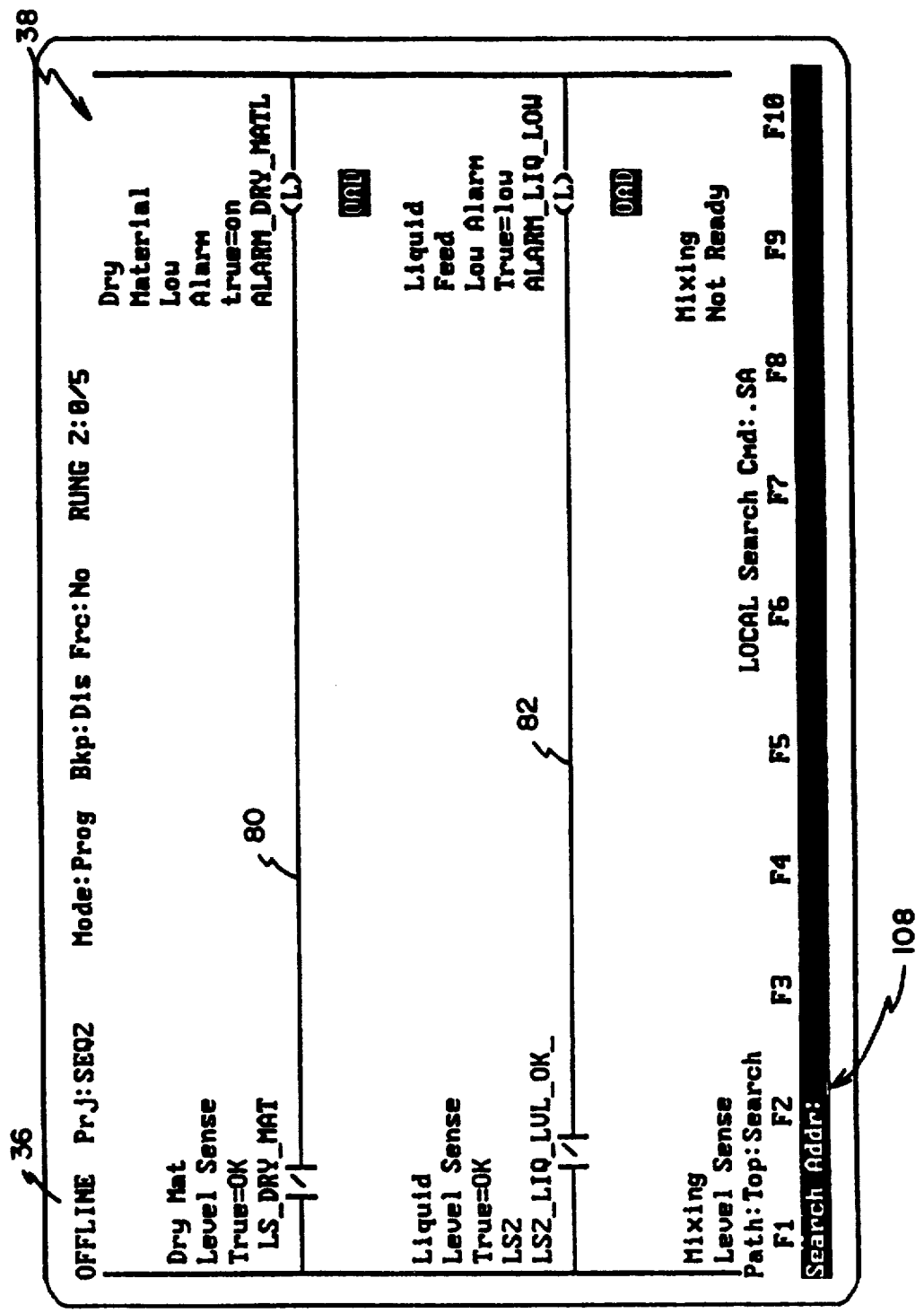
FIG. 7 is a Search For An Address screen displayed after the F2 (Addrsym) key is pressed in FIG. 4.
Figure 8:
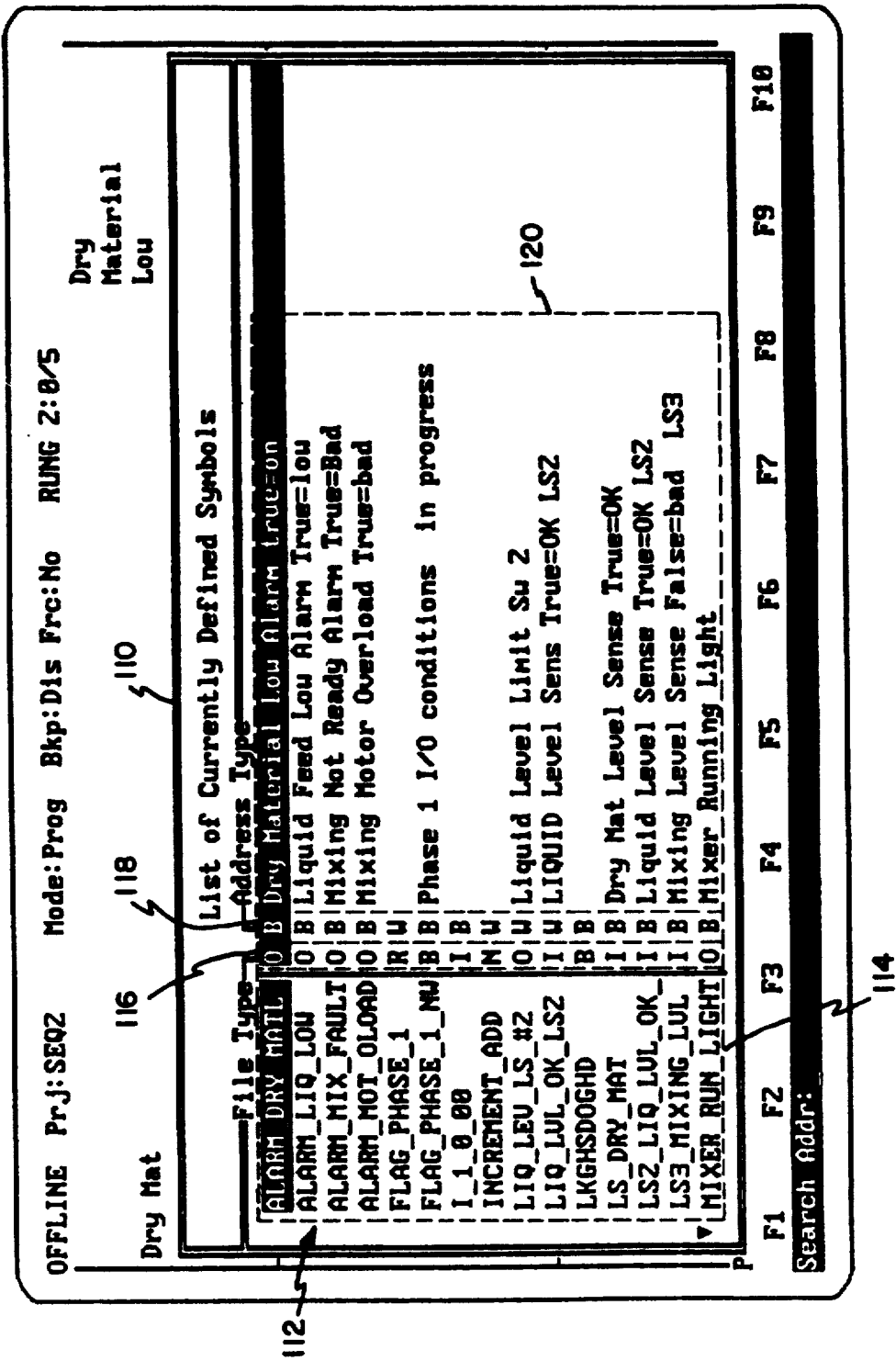
FIG. 8 is a screen showing a list of currently defined symbols as maintained by the software package.

This function is invoked by pressing the F2 (Addrsym) key 62 in FIG. 4. FIG. 7 is then displayed. The user may search the ladder logic program 38 for either an address or a symbol, regardless of the instruction type. The user enters the address or symbol to search for at the prompt 37 Search Addr:" 108. The user has the option of entering either a complete address or a complete symbol. Alternatively, the user may press the Insert key to display a list 112 of currently defined symbols as shown in FIG. 8, and select a symbol therefrom.

Searching begins from the current rung 80 in the ladder logic program 38 and continues until the next occurrence of the address or until no matching address or symbol is located. Note that the search is conducted throughout the entire ladder logic program 38. No matter where the user is in the ladder logic program 38, the search will start, and wrap around to, the beginning point of the search 80.

When a match is found, an editing screen 36, such as the one shown in FIG. 4, is displayed wherein the cursor is positioned on the matched item.

To search for additional instructions of the same type, the F1 (Search) key 40 is pressed, until a message "Not Found" 106 is displayed, as shown in FIG. 6.

Search For An Address/Instruction Combination

Figure 9:
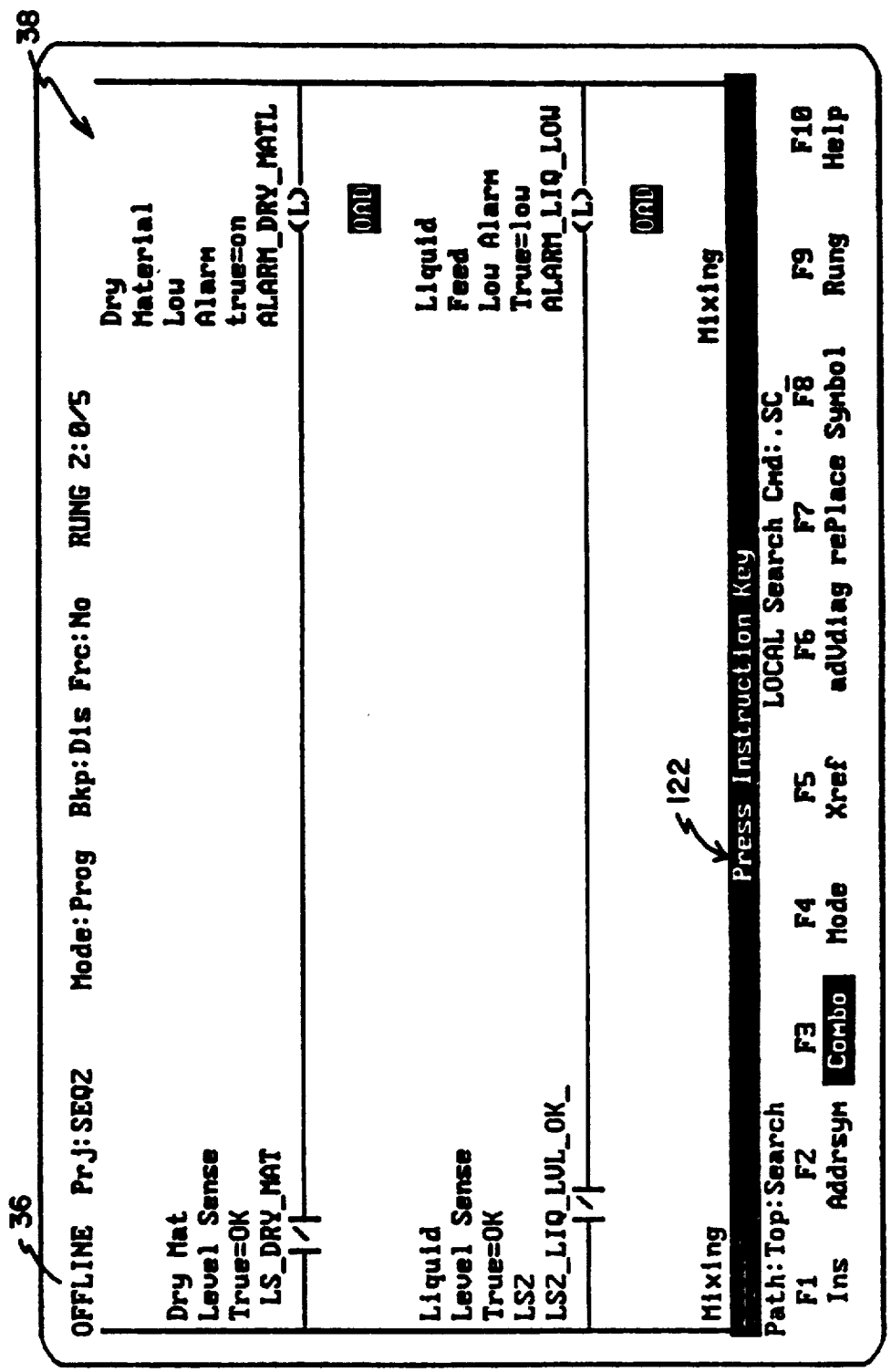
FIG. 9 is a Search For An Address/Instruction Combination screen displayed after the F3 (Combo) key is pressed in FIG. 4.

This function is invoked by pressing the F3 (Combo) key 64 in FIG. 4. FIG. 9 is then displayed. The user may search for a specific instruction that uses a specific address. The user enters an instruction type at the prompt "Press Instruction Key" 122. The user enters the instruction type in one of the same three ways that the instruction was first entered into the ladder logic program 38:

1. Pressing the program assignment key (A-Z) assigned to the instruction. For example, the letter "X" may have been assigned to the "XIC" instruction by default. Current key definitions can be reviewed.

2. Entering the three letter mnemonic for the instruction proceeded by a "/", for example, "/XIO".

3. Pressing the function key assigned to the instruction.

Figure 10:
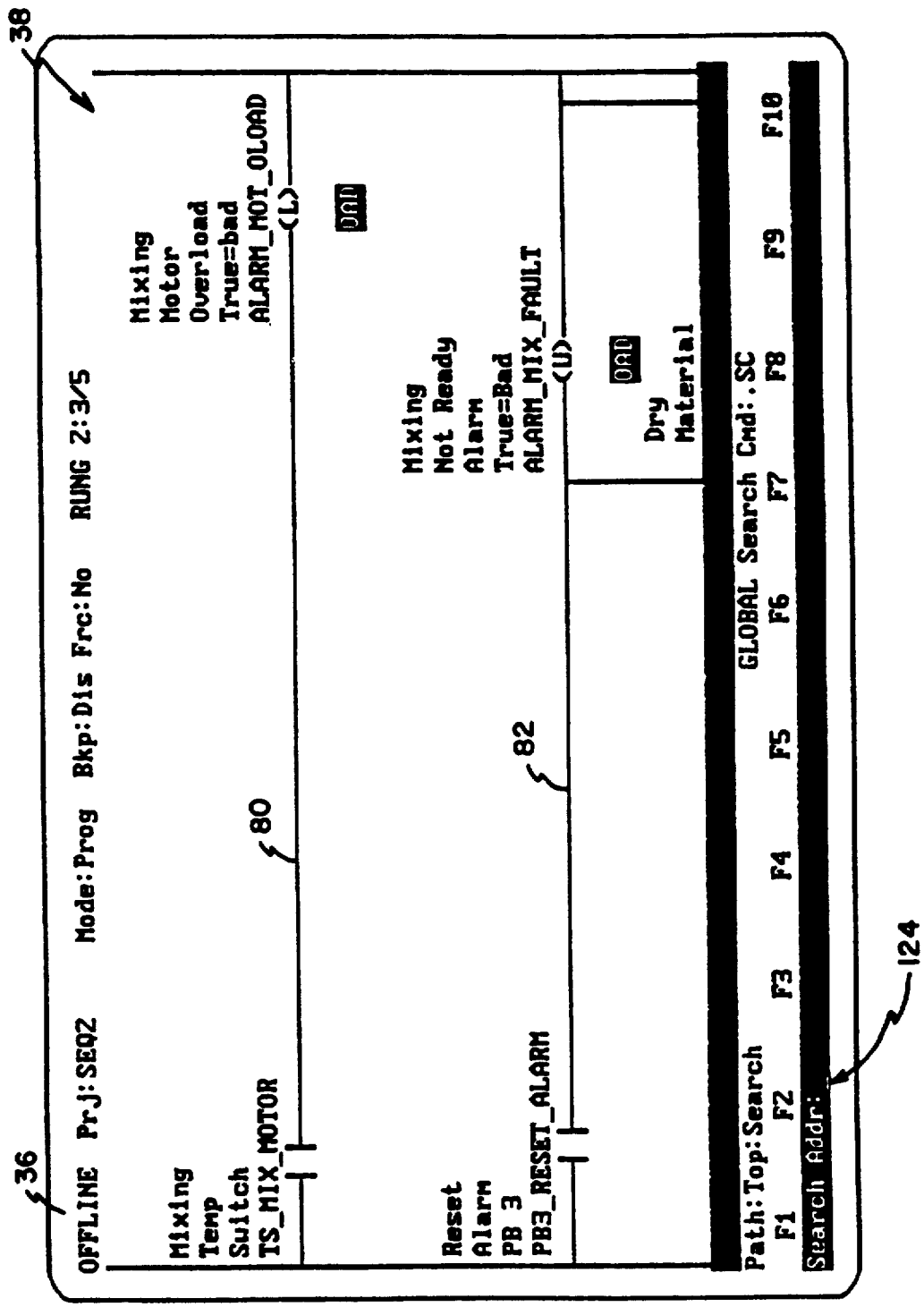
FIG. 10 is a Search For An Address/Instruction Combination screen displayed after an instruction has been specified in FIG. 9.

After the instruction is entered, FIG. 10 is displayed, and the user enters the address or symbol to search for at the prompt "Search Addr:" 124. The user has the option of entering either a complete address or a complete symbol. Alternatively, the user may press the Insert key to display a list 112 of currently defined symbols as shown in FIG. 8, and select a symbol therefrom.

Searching begins from the current [address]rung 80 and continues until the next occurrence of the instruction/address combination or until no matching instruction/address combination is located. Note that the search is conducted throughout the entire ladder logic program 38. No matter where the user is in the ladder logic program 38, the search will start, and wrap around to, the beginning point of the search 80.

When a match is found, an editing screen 36, such as the one shown in FIG. 4, is displayed wherein the cursor is positioned on the matched item.

To search for additional instructions of the same type, the F1 (Search) key 40 is pressed, until a message "Not Found" 106 is displayed [,] as shown in FIG. 6.

Search Mode

This function is invoked by pressing the F4 (Mode) key 66 in FIG. 4. The search mode toggles between global and local. The current mode is indicated by the legend, for example, "LOCAL" 126 above the F6 (adV-diag) key 70 in FIG. 4. Searches can be limited to the current ladder logic program file by specifying a "local" search, or, the searches can be expanded to include all ladder logic program files known to the software package by specifying a "global" search.

Cross Reference Search

Figure 2:
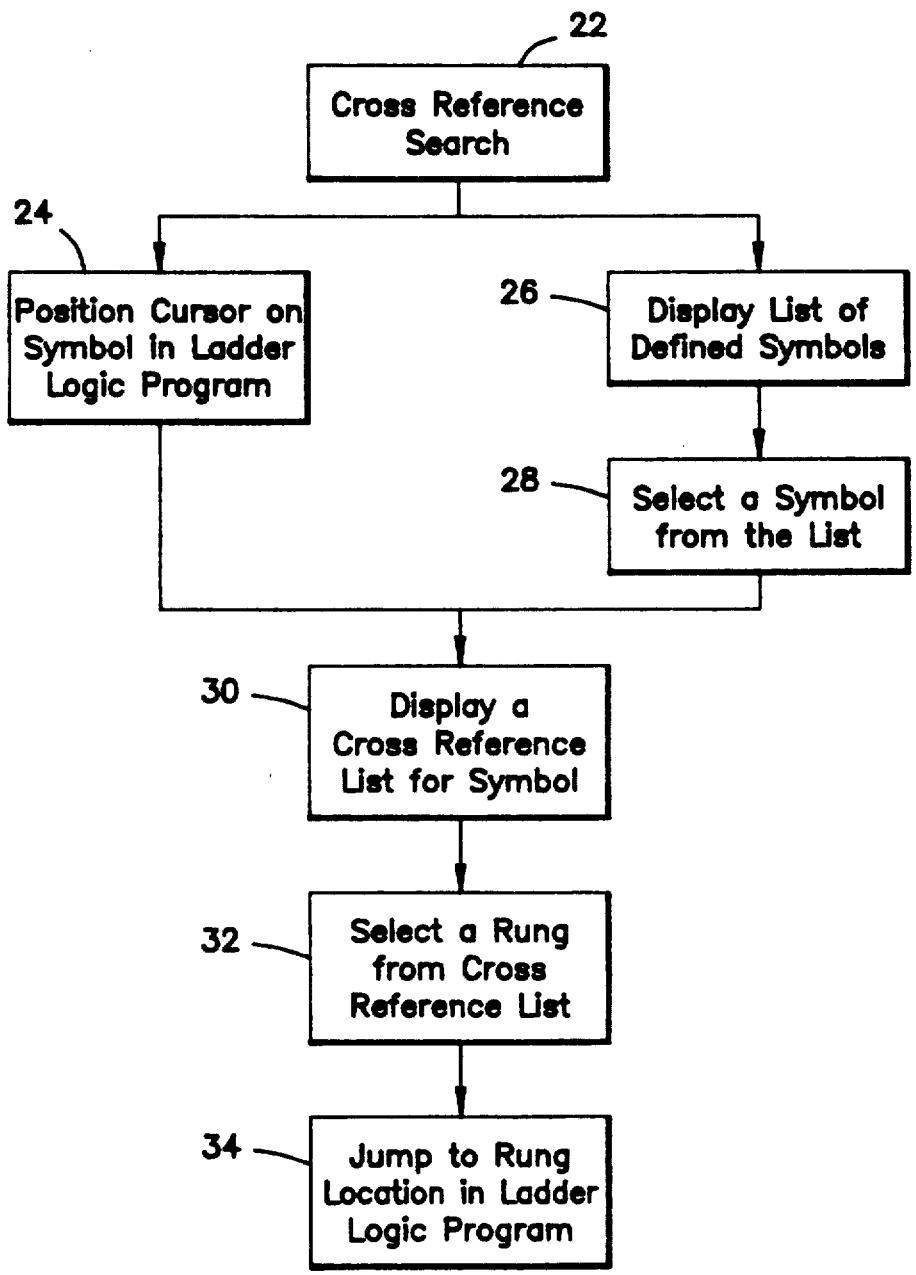
FIG. 2 is a block diagram describing the steps of the cross-reference search option.

FIG. 2 is a block diagram describing the steps 22-34 of the Cross-Reference Search option. Two Cross-Reference Search options are available for the user.

Figure 11:
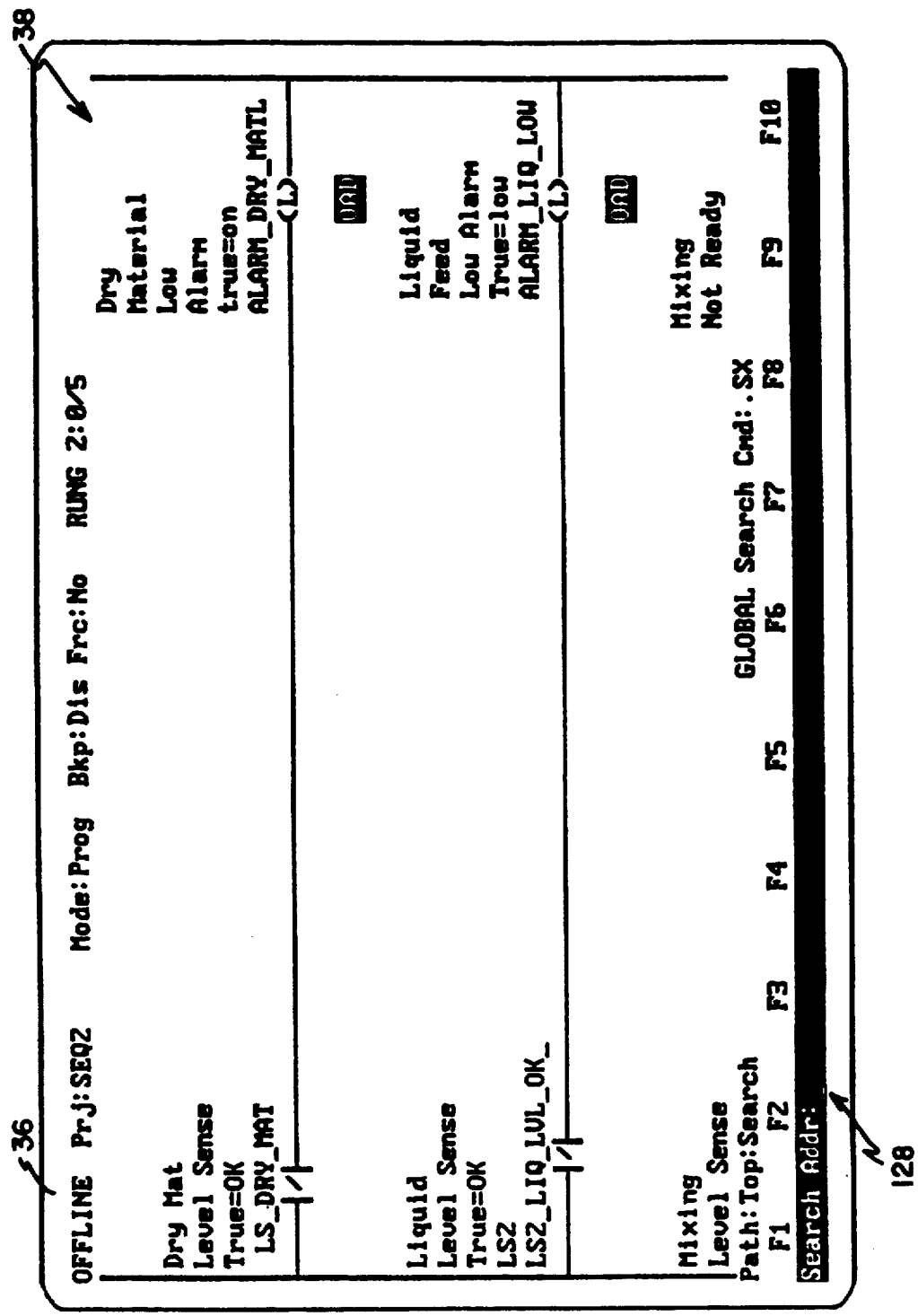
FIG. 11 is a Cross-Reference Search screen displayed after the F5 (Xref) key is pressed in FIG. 4.

This function is invoked by pressing the F5 (Xref) key 68 in FIG. 4. In the first Cross-Reference Search option, wherein the cursor is positioned on a power rail 84 or 86 in FIG. 4, after the F5 (Xref) key 68 is pressed, FIG. 11 is displayed and the user enters the address or symbol to search for at the prompt "Search Addr:" 128. The user has the option of entering either a complete address or a complete symbol. Alternatively, the user may press the Insert key to display a list 112 of currently defined symbols as shown in FIG. 8, and select a symbol therefrom. After a symbol or address is entered, or a symbol is selected from the symbol list 112, then a cross-reference list 130 is displayed for the symbol or address as shown in FIG. 12.

Figure 12:
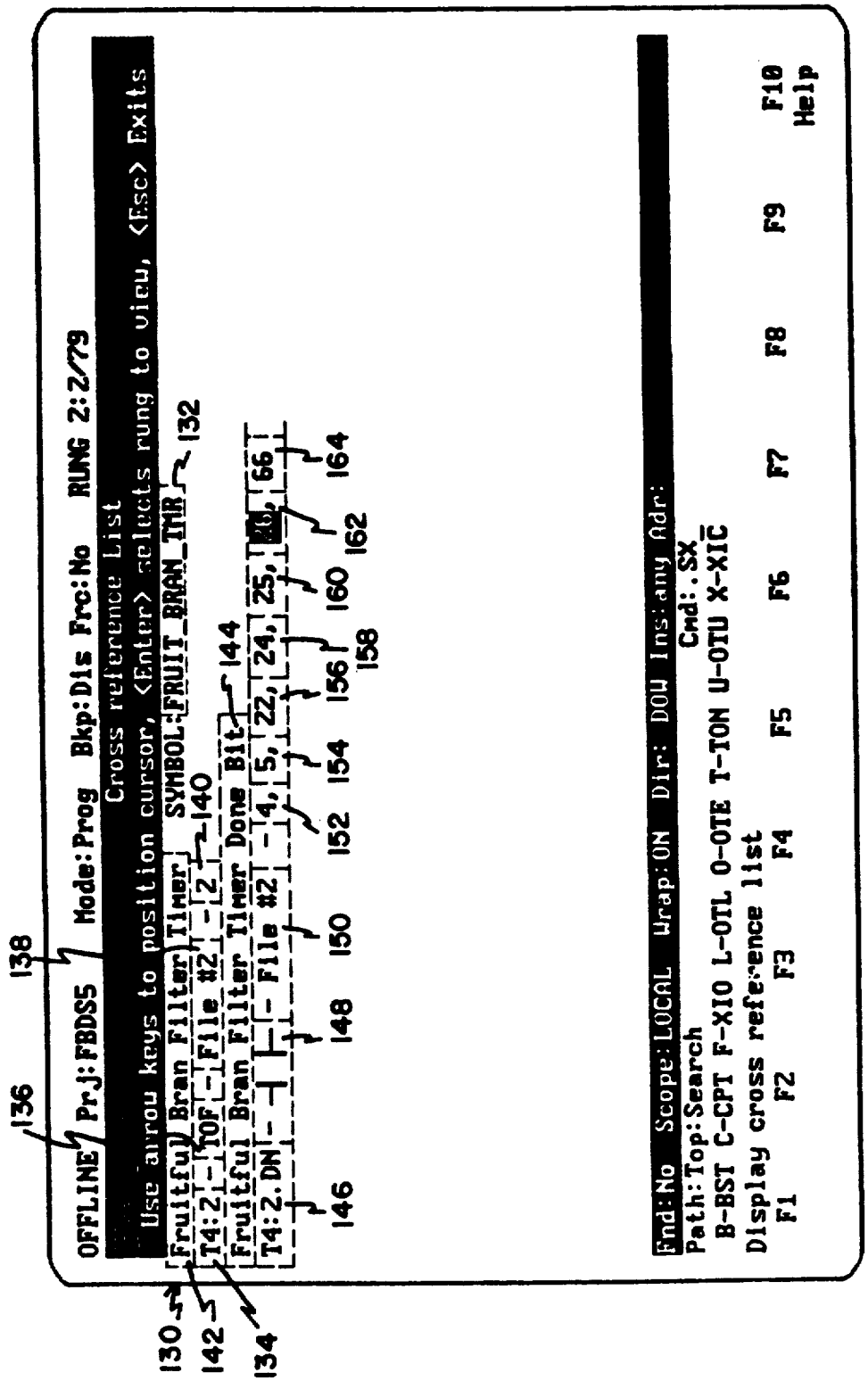
FIG. 12 is a Cross-Reference List screen displayed after the symbol, FRUIT_BRAN_TMR, has been selected from the list of symbols in FIG. 8.

In the second Cross-Reference Search option, wherein the cursor is positioned on an instruction, for example, 90, 94, 98, or 102 in FIG. 4, the cross-reference list 130 is displayed for the symbol or address used by the instruction as shown in FIG. 12 after the F5 (Xref) key 68 is pressed.

FIG. 12 shows a cross-reference list 130 for a symbol 132, FRUIT_BRAN_TMR, selected from the list 112 of symbols in FIG. 8. The information displayed in the list 130 includes: (1) the address 134 under review; (2) the types of instructions 136 that reference the address; (3) the ladder logic program file numbers 138 where the address is used; and (4) the rung numbers 140, by file, that use the address. In FIG. 12, the cross-reference list begins 130 with the symbol description 142, "Fruitful Bran Filter Timer", followed by the symbol 132 [name] FRUIT_BRAN_TMR. On the second line, the symbol 132 is identified by its address 134, T4:2, followed by the type of instruction 136, "TOF", the program file number 138, #2, and the rung numbers 140 where the instruction occurs, 2.

Alternative uses of the address 134 or symbol 132 are also listed, for example, where specific bits of the address 134 or symbol 132 are used by instructions. In FIG. 12, on the third line, an alternative use of the symbol 132 FRUIT_BRAN_TMR is shown. The alternative use begins with the symbol description 144 "Fruitful Bran Filter Timer Done Bit". On the fourth line, the "done" bit of the symbol 132 is identified by its address 146, T4:2.DN, followed by a graphical representation of the instruction 148, Examine If Closed, the program file number 150, #2, and the rung numbers where the instruction 148 occurs (152-164), 4, 5, 22, 24, 25, 26, and 66.

From the screen in FIG. 12, the user can select a rung number 140, 152, and 164 where the address 134 or symbol 132 is being used, and immediately jump to that rung location in the ladder logic program 38. The user can select the rung by positioning the cursor on the rung number 140, 152, and 164 in FIG. 12, thus highlighting the rung number as shown for rung 26 (162). The user presses the Enter key to view the highlighted rung 162.

Section Header (Page Title) Search

Figure 13:
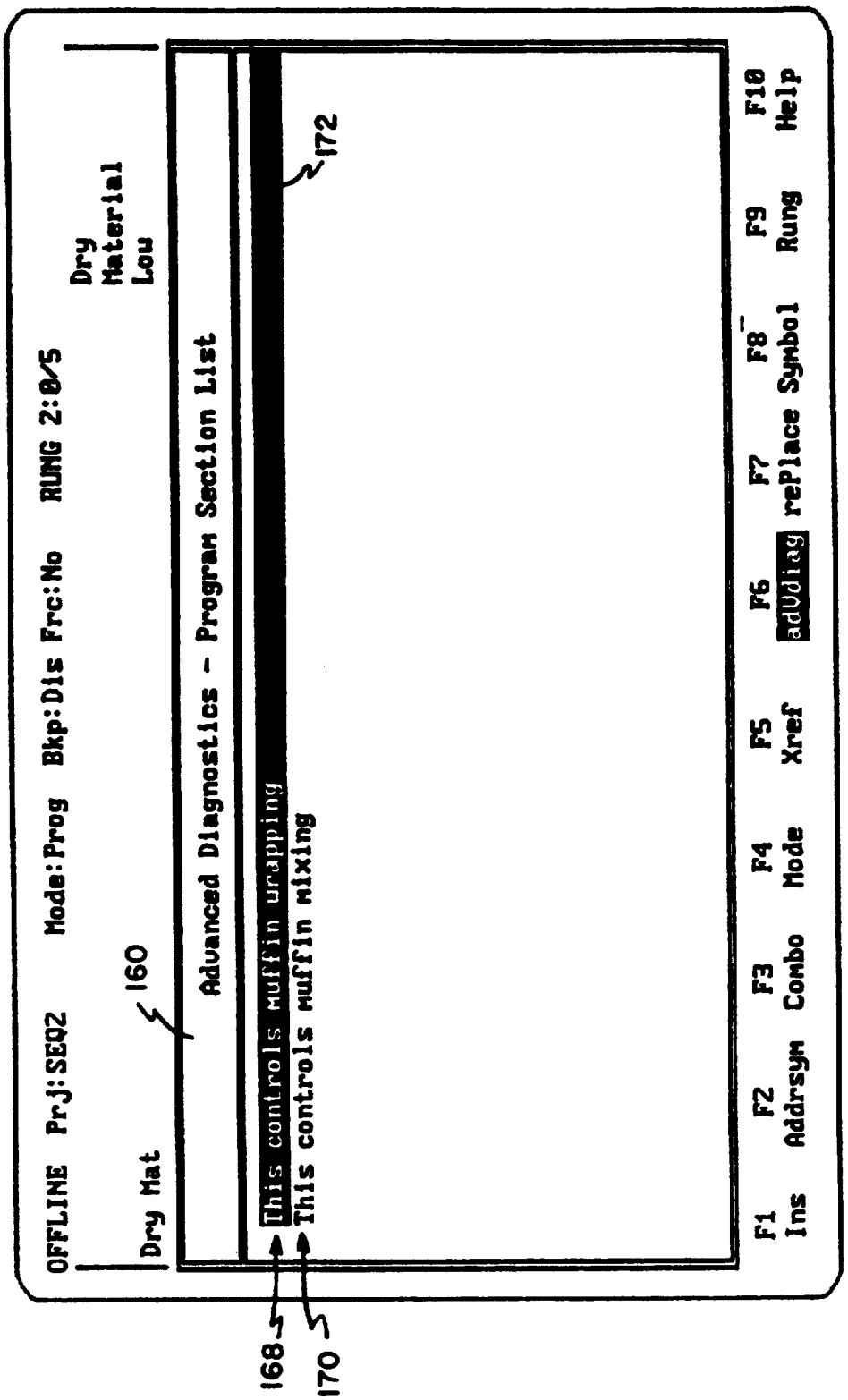
FIG. 13 is a Section Search screen displayed after the F6 (adVdiag) key is pressed in FIG. 4.

This function is invoked by pressing the F6 (adVdiag) key 70 in FIG. 4. FIG. 13 is then displayed. The user may search for section headers (page titles), for example 168 and 170, in the ladder logic program 38. The section headers 168 and 170 provide a convenient method of dividing a ladder logic program 38 into groups of related rungs. FIG. 13 shows a list of section headers 168 and 170 for rungs in the ladder logic program 38. The cursor 172 is positioned on a section header 168, thus highlighting the section header 168. The user selects by pressing the Enter key, and immediately jumps to that rung location in the ladder logic program 38.

Search And Replace Addresses

Figure 14:
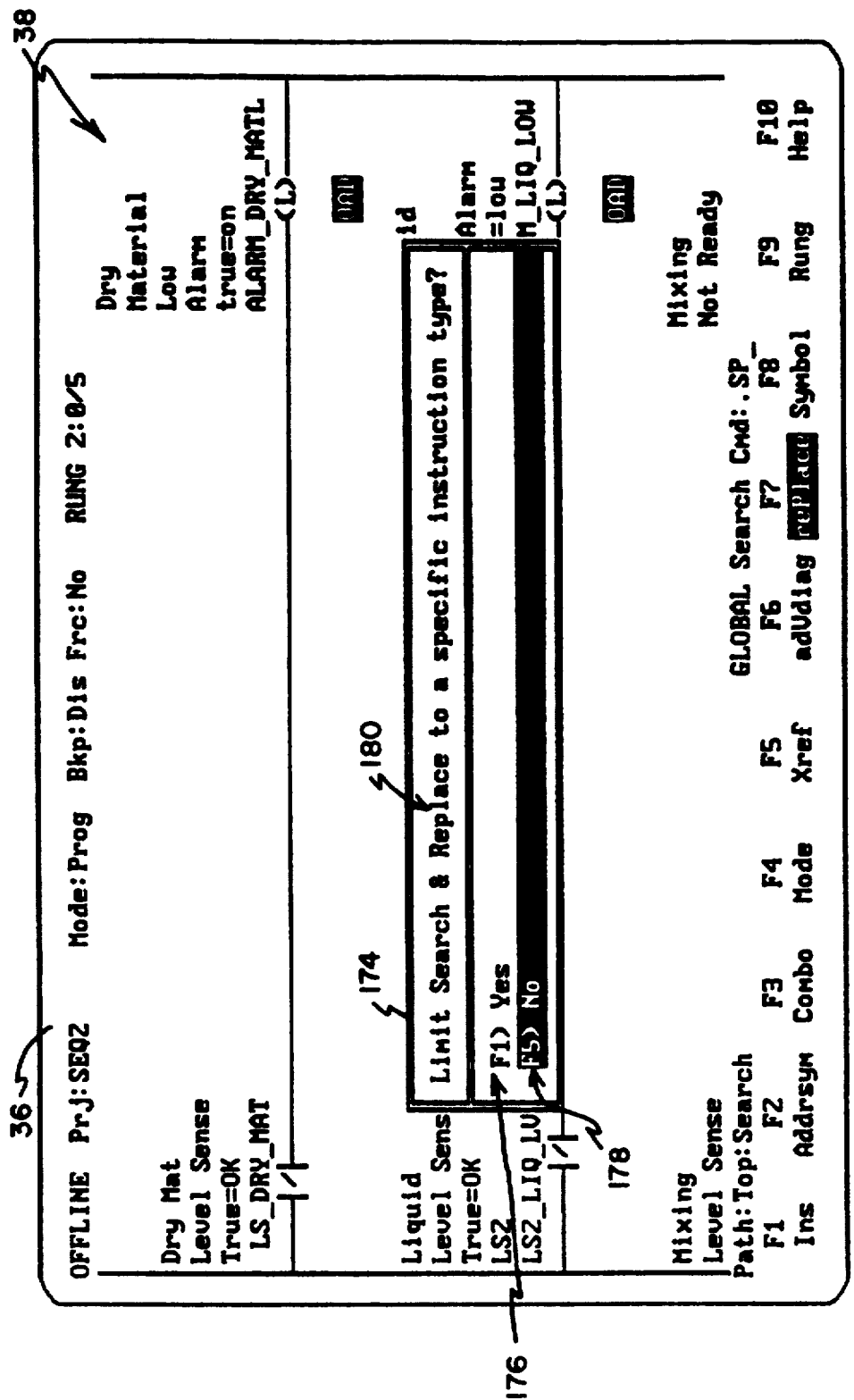
FIG. 14 is a Search And Replace Addresses screen displayed after the F7 (rePlace) key is pressed in FIG. 4.

This function is invoked by pressing the F7 (rePlace) key 72 in FIG. 4. The small window 174 shown in FIG. 14 is then displayed, overlaying a portion of the screen 36 in FIG. 4. The user may search the ladder logic program 38 for an address and replace it with a different address. The user can limit the Search And Replace function to an address and instruction combination, or the user can Search And Replace an address regardless of the instruction type.

Figure 15:
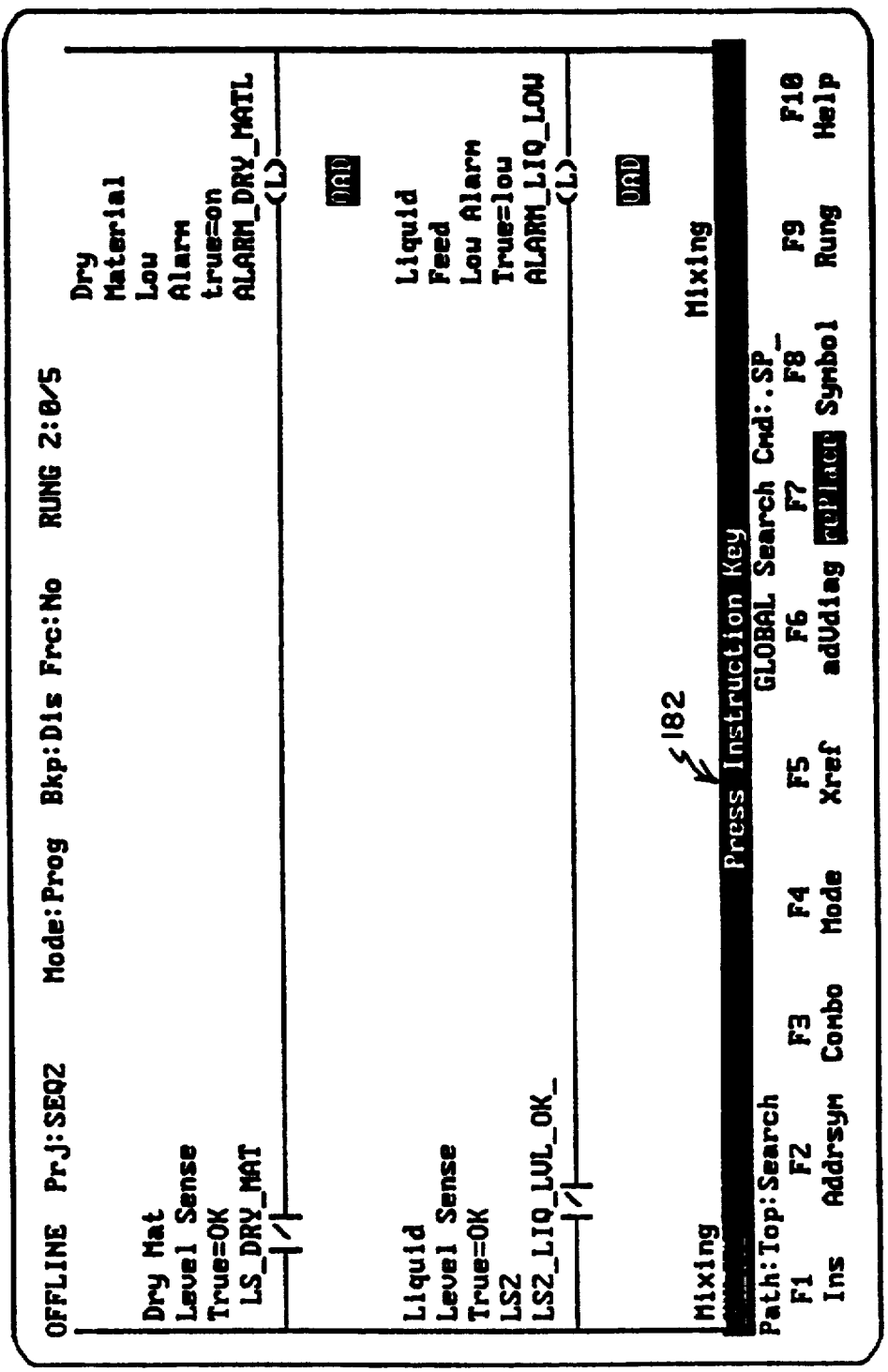
FIG. 15 is a Search And Replace Addresses screen displayed after the F1 (Yes) key is pressed in FIG. 14.

If the user presses the F1 (Yes) key 176 in the small window 174 shown in FIG. 14, then FIG. 15 is displayed. The user may search for a specific instruction that uses a specific address. The user enters an instruction type at the prompt "Press Instruction Key" 182. The user enters the instruction type in one of the same three ways that the instruction was first entered into the ladder logic program 38:

1. Pressing the program assignment key (A-Z) assigned to the instruction. For example, the letter "X" may have been assigned to the "XIC" instruction by default. Current key definitions can be reviewed.

2. Entering the three letter mnemonic for the instruction proceeded by a "/", for example, "/XIO".

3. Pressing the function key assigned to the instruction.

Figure 16:
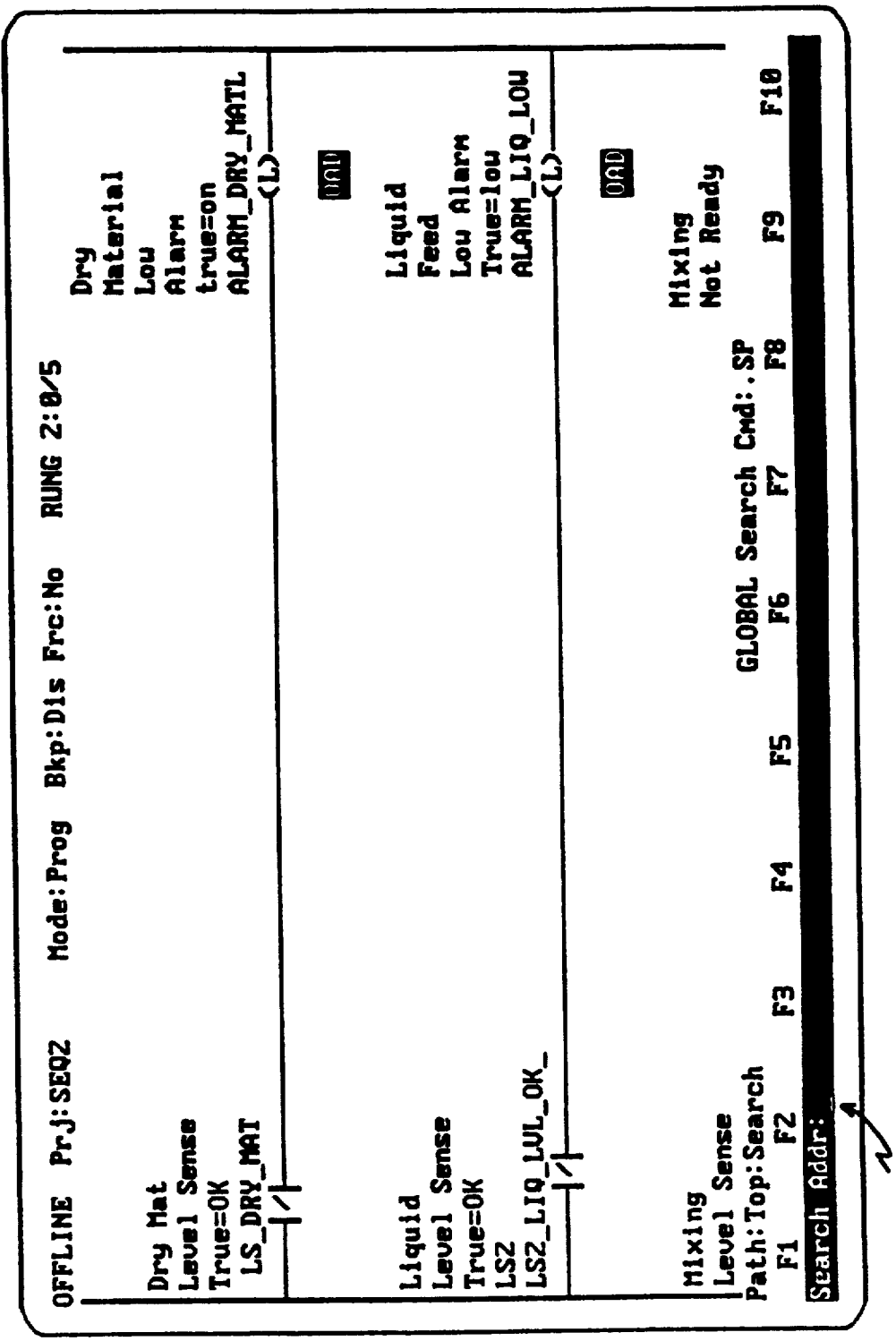
FIG. 16 is a Search And Replace Addresses screen displayed after an instruction has been specified in FIG. 15.

After the user specifies the instruction, FIG. 16 is displayed. The user enters an address or symbol at the prompt "Search Addr:" 184. The user has the option of entering either a complete address or a complete symbol. Alternatively, the user may press the Insert key to display a list 112 of currently defined symbols as shown in FIG. 8, and select a symbol therefrom.

Figure 17:
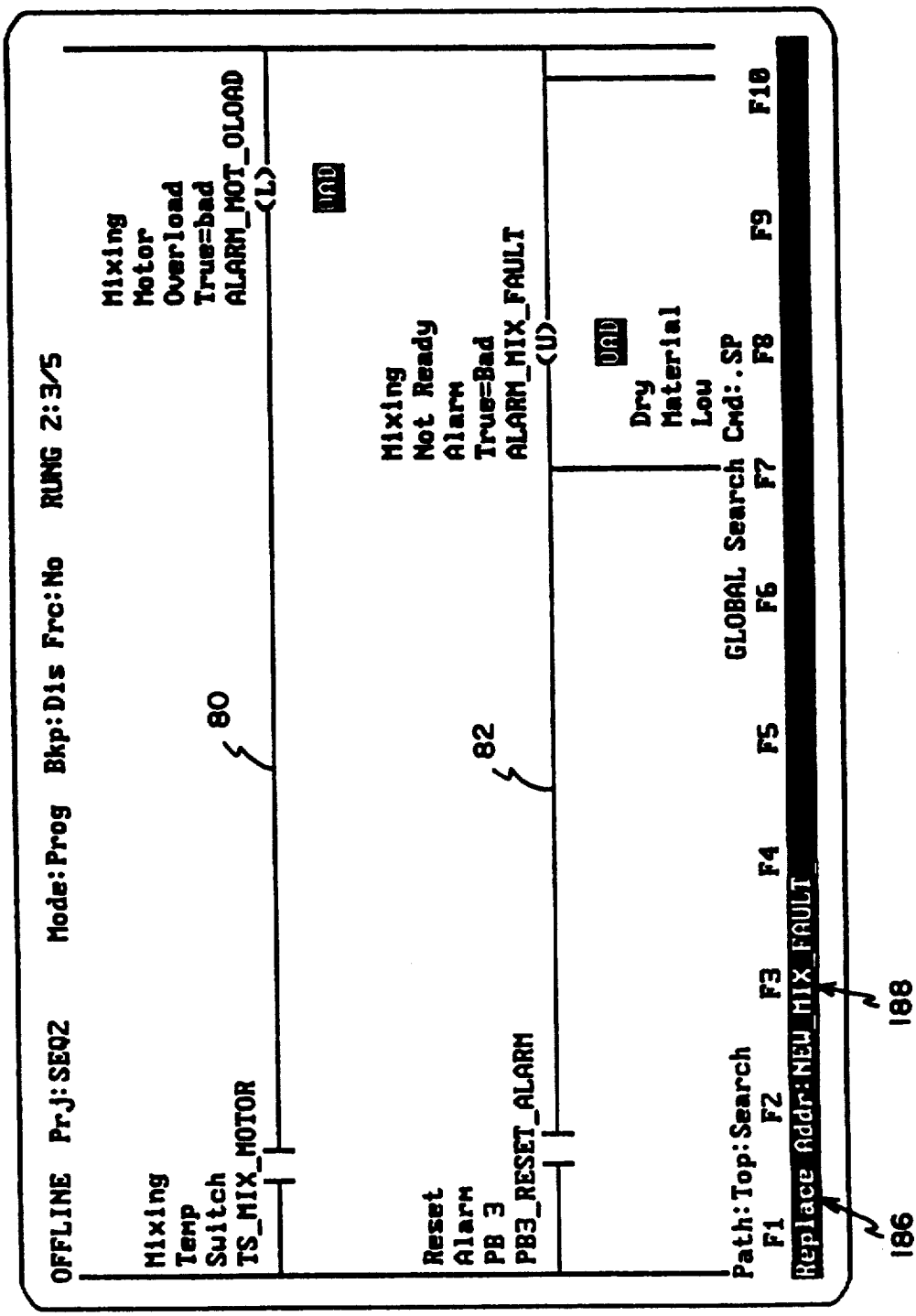
FIG. 17 is a Search And Replace Addresses screen displayed after an address has been specified in FIG. 16.
Figure 18:
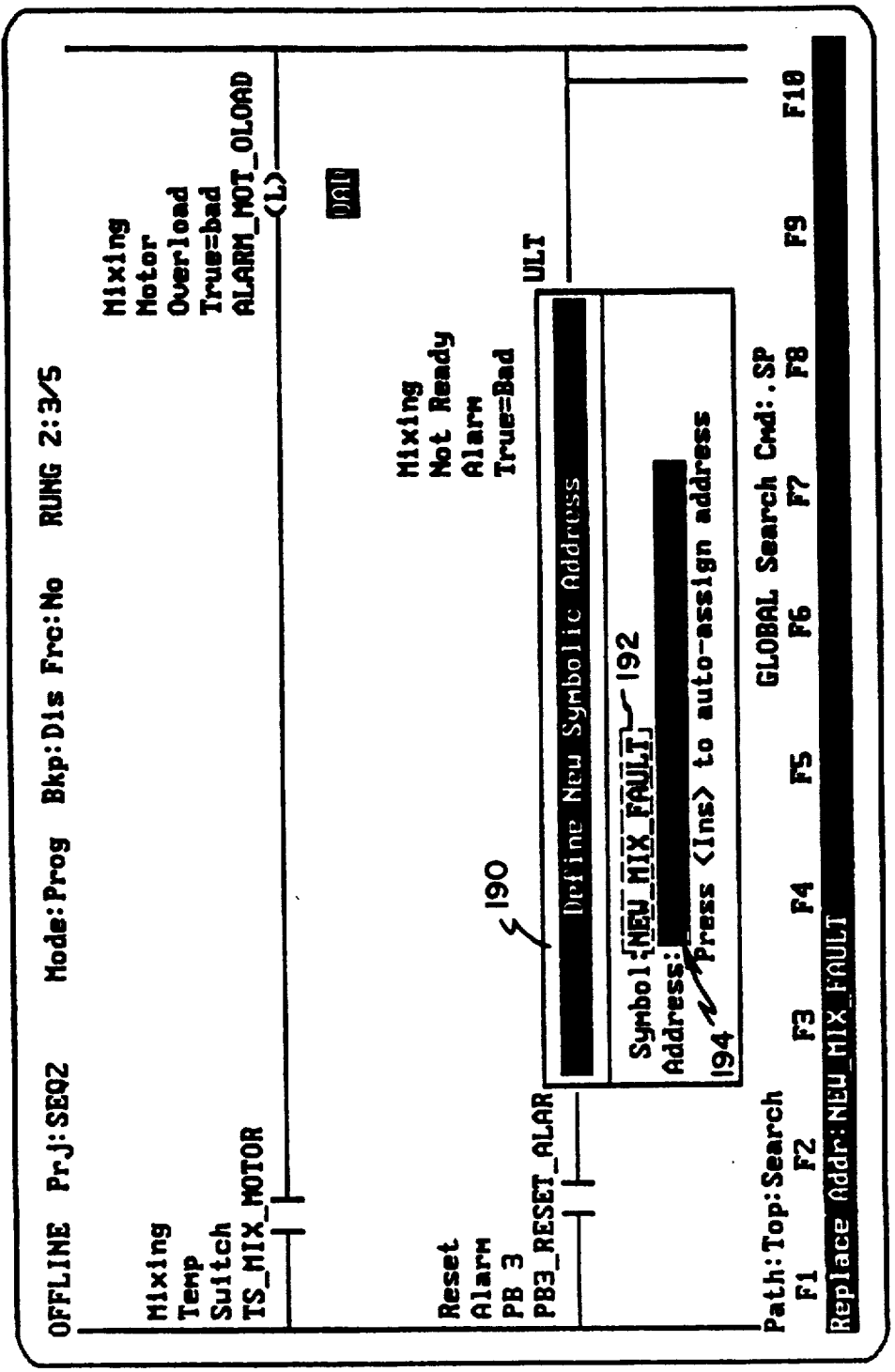
FIG. 18 is a Search And Replace Addresses screen displayed after a new symbol has been specified in FIG. 17.

After the user specifies the address, FIG. 17 is displayed. The user enters the address or symbol to replace the searched address at the prompt "Replace Addr:" 186. The user has the option of entering either a complete address or a complete symbol. Alternatively, the user may press the Insert key to display a list 112 of currently defined symbols as shown in FIG. 8, and select a symbol therefrom. If a new symbol 188 is specified, then the window 190 in FIG. 18 is displayed, prompting for an address 194. The methods of specifying addresses for symbols is more fully discussed in the co-pending and commonly assigned patent application "A METHOD AND APPARATUS FOR SYMBOLIC LADDER LOGIC PROGRAMMING WITH AUTOMATIC ATTACHMENT OF ADDRESSES", by Zifferer et al., which application was incorporated by reference herein earlier.

To enhance the power of this utility, the use of "wild card" characters, for example, "*" and "?", are supported. For example, to change all references in the integer file N7 to another integer file N9, the user would enter:

"Search Addr:" N7:*
"Replace Addr:" N9:*

Searching begins from the current address and continues until the next occurrence of the instruction/address combination or until no matching instruction/address combination is located. Note that the search is conducted throughout the entire ladder logic program 38. No matter where the user is in the ladder logic program 38, the search will start, and wrap around to, the beginning point of the search.

Figure 19:
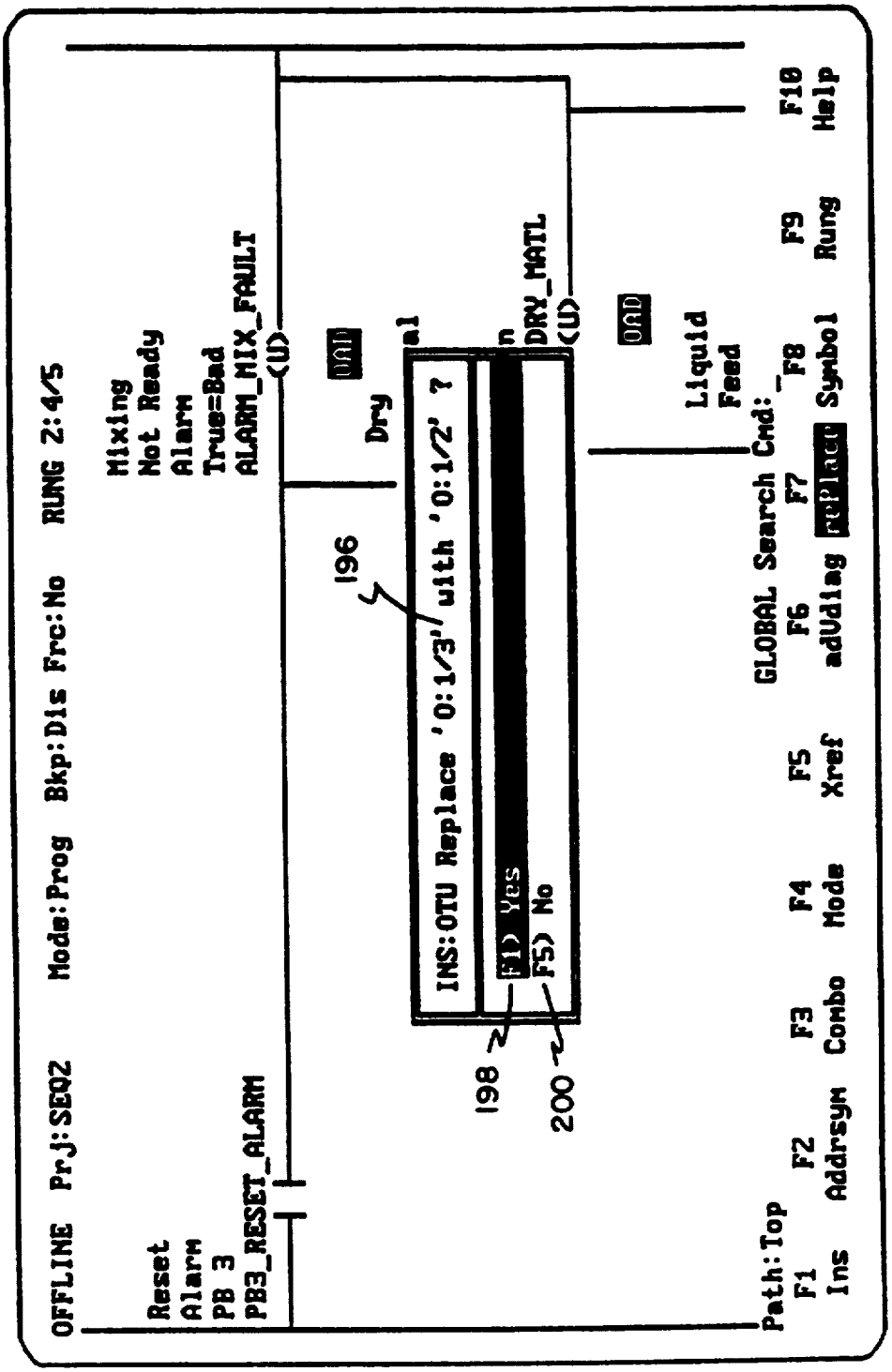
FIG. 19 is a Search And Replace Addresses screen displayed for each occurrence of a match.

For each occurrence of the searched address, the user is asked whether or not to execute the Replace function (196) as shown in FIG. 19. As the addresses are located and replaced as needed, the cross-reference information stored in the software package is updated. Instruction descriptions are also transferred to the new address.

If the user presses the F5 (No) key 178 in the small window 174 shown in FIG. 14, FIGS. 16, 17, and 18 are displayed. The steps are identical to those described herein earlier when the F1 (Yes) key 176 was pressed. In both cases, the user enters the "Search Addr:" 184 and the "Replace Addr:" 186. The only difference is that by pressing the F5 (No) key 178, the user does not specify an instruction for the search.

Search For A Symbol

Figure 20:
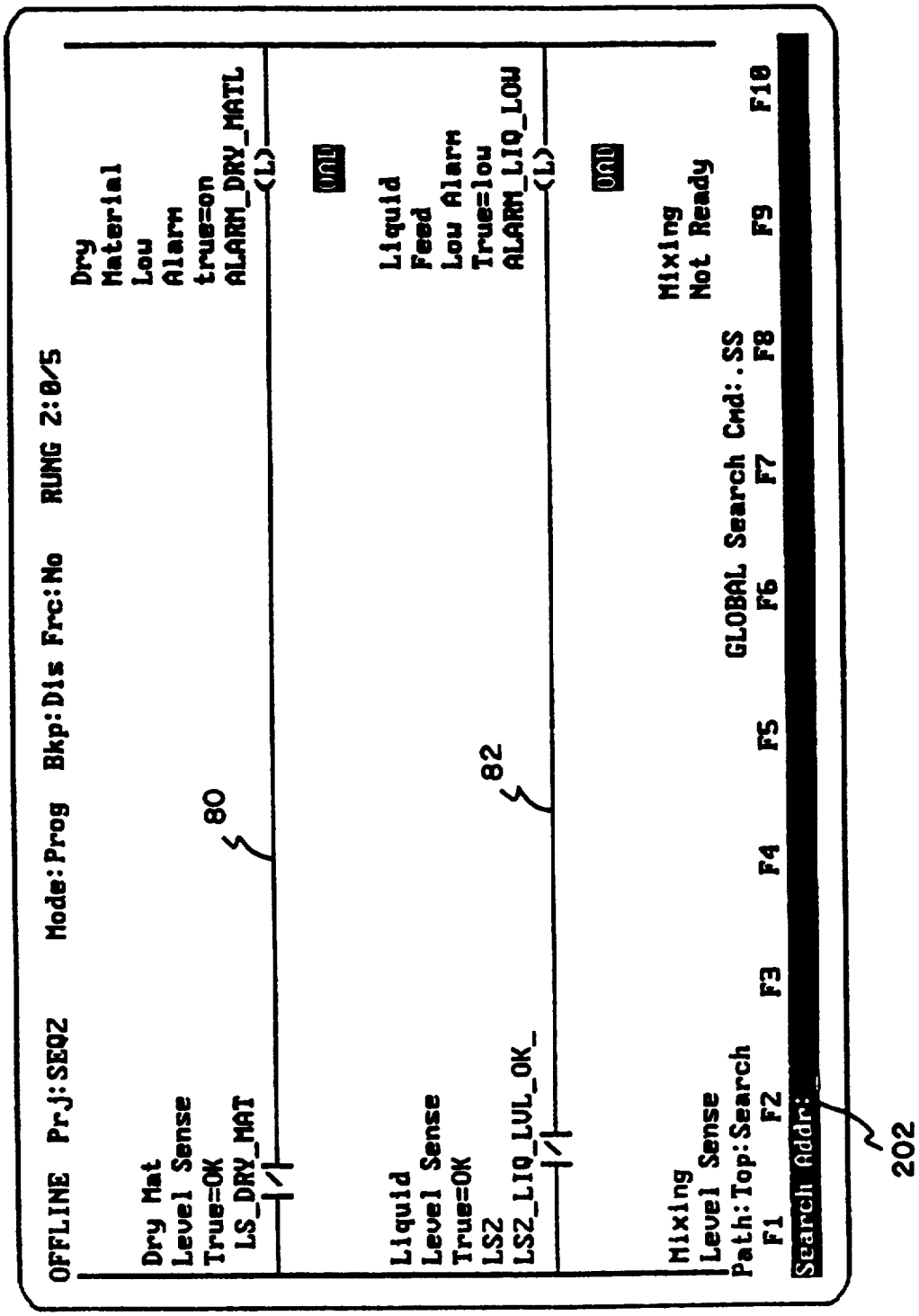
FIG. 20 is a Search For A Symbol screen displayed after the F8 (Symbol) key is pressed in FIG. 4.

This function is invoked by pressing the F8 (Symbol) key 74 in FIG. 4. FIG. 20 is then displayed. This function lists all defined symbols and, once selected, will move the cursor to the searched symbol's next location in the ladder logic program 38.

The user enters the symbol to search for at the prompt "Search Addr:" 202. As the user begins typing the name for the symbol, the cursor is moved to the location in the ladder logic program 38 of the next available symbol matching the letters entered by the user. Alternatively, the user may press the Insert key to display a list 112 of currently defined symbols as shown in FIG. 8, and select a symbol therefrom.

Searching begins from the current rung 80 in the ladder logic program 38 and continues until the next occurrence of the address or until no matching address or symbol is located. Note that the search is conducted throughout the entire ladder logic program 38. No matter where the user is in the ladder logic program 38, the search will start, and wrap around to, the beginning point of the search 80.

When a match is found, an editing screen, such as the one shown in FIG. 4, is displayed wherein the cursor is positioned on the matched item.

To search for additional instructions of the same type, the F1 (Search) key 40 is pressed, until a message "Not Found" 106 is displayed, as shown in FIG. 6.

Search For A Rung

Figure 21:
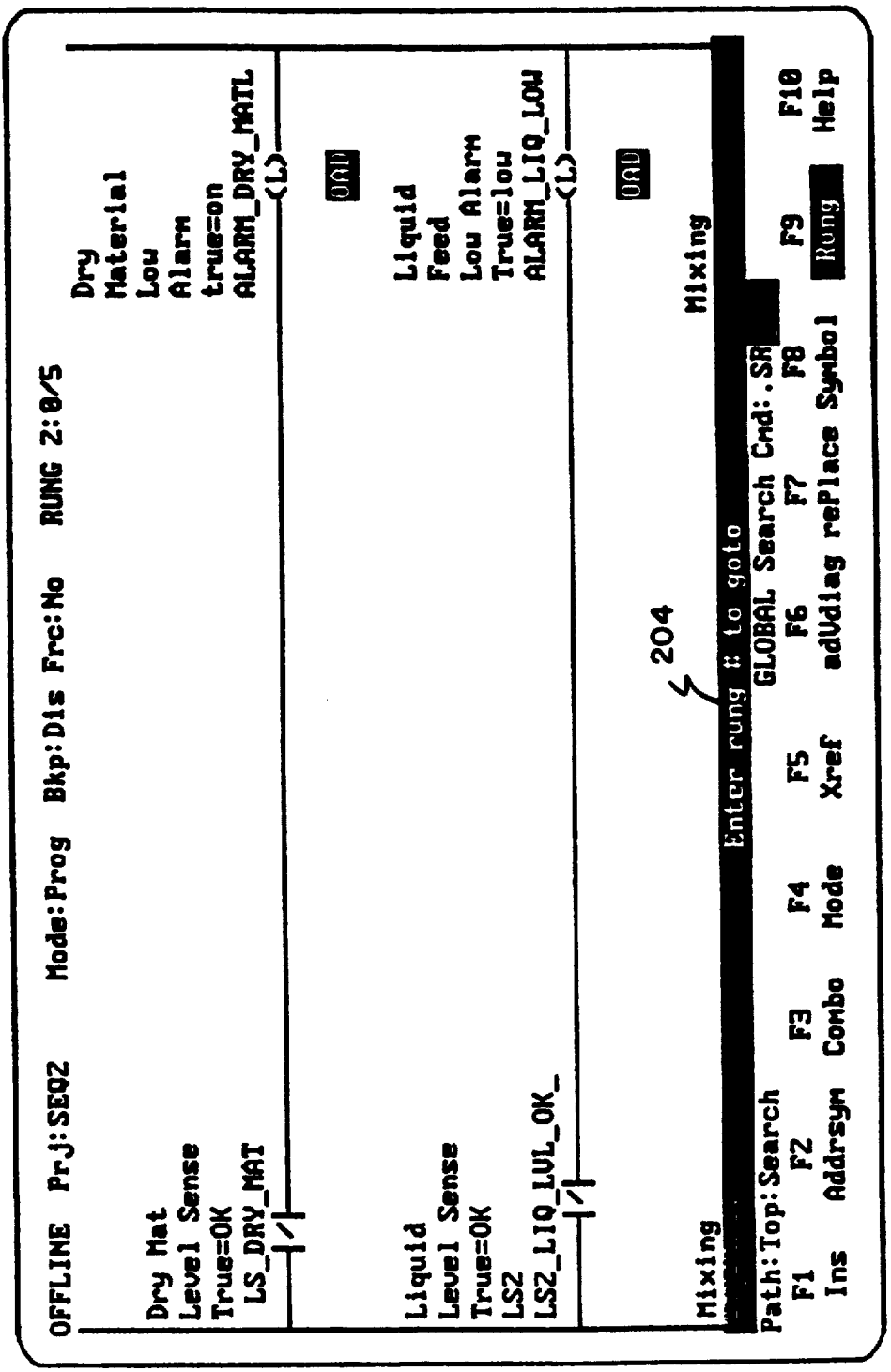
FIG. 21 is a Search For A Rung screen displayed after the F9 (Rung) key is pressed in FIG. 4.
Figure 22:
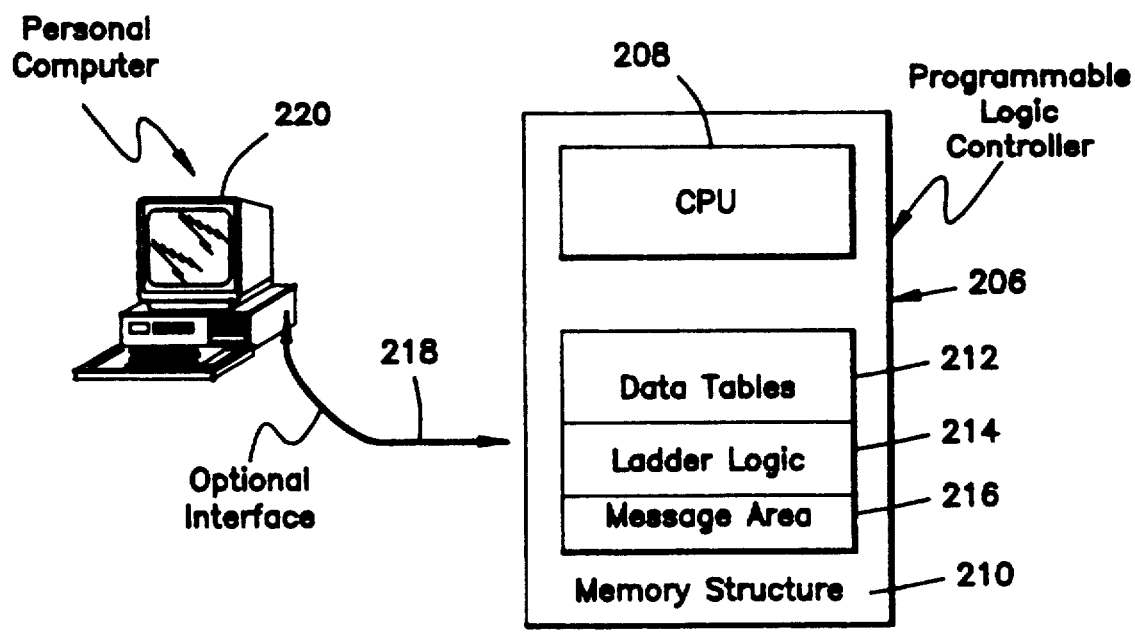
FIG. 22 is an illustration describing a programmable logic controller with an optional computer attached thereto.
Figure 23:
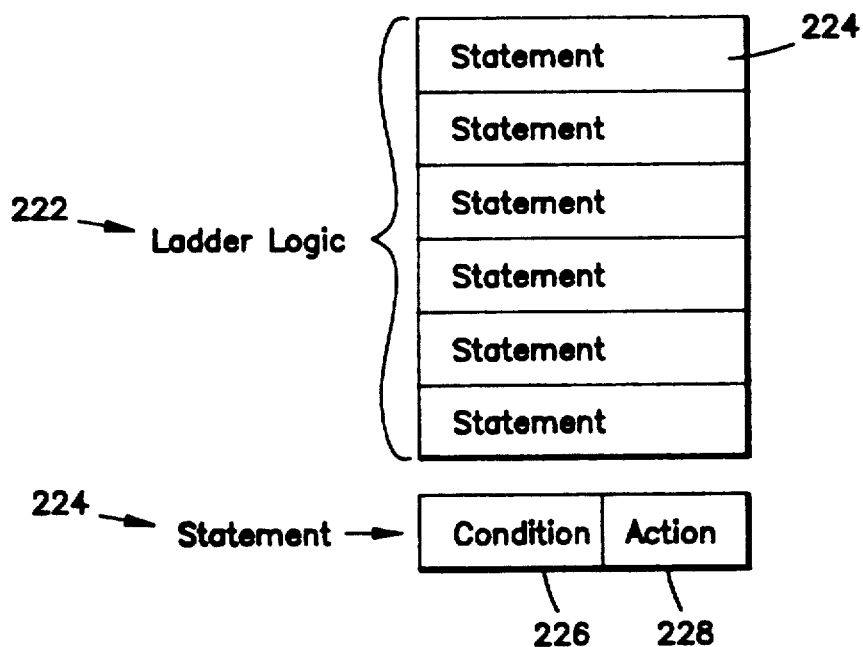
FIG. 23 is an illustration describing the structure of a ladder logic program in the programmable logic controller.

This function is invoked by pressing the F9 (Rung) key 76 in FIG. 4. FIG. 21 is then displayed. The user may enter any valid rung number at the prompt "Enter rung # to goto:" 204 and jump immediately to that rung's location in the ladder logic program 38. Of course, for moving short distances, the Arrow keys could be used.

Conclusion

Although a specific embodiment of the present invention has been illustrated herein, it will be appreciated by those in ordinary skill in the art that any method or arrangement which is calculated to achieve the same purpose may be substituted for the specific embodiment shown. Thus, the present invention disclosed herein may be implemented through the use of different display screens, different commands, different key combinations, and different steps. This application is intended to cover any adaptations or variations thereof. Therefore, it is manifestly intended that this invention be limited only by the claims and the equivalence thereof.

What is claimed is:

1. A method of navigating through a program using a computer, the program being stored in memory on a computer and comprising a plurality of instructions and a plurality of data elements each located at a particular address, each instruction referencing at least one data element using the address for the element, the method comprising:
   (a) displaying the program on a monitor attached to the computer, accepting commands from an operator into the computer, and modifying the program in the computer in response to the accepted commands;
   (b) selecting a data element address from the displayed program by accepting commands from the operator into the computer by highlighting an the address on the monitor using a cursor-controlled movable highlighting element;
   (c) displaying a cross-reference list for the selected address on a monitor attached to the computer, wherein the displaying step (c) comprises overlaying at least a portion of the displayed program on the monitor with the displayed cross-reference list, wherein the cross-reference list comprises program identifiers for programs containing instructions which reference the selected address, instruction types for the instructions which reference the selected address, and instruction locations in the programs for instructions which reference the selected address;
   (d) selecting a location from the cross-reference list displayed on the monitor by accepting commands from the operator into the computer by highlighting the location no the monitor using a cursor-controlled movable highlighting element; and
   (e) displaying the program containing the instruction on the monitor at the selected location in the program, wherein the displaying step (e) comprises overlaying at least a portion of the displayed cross-reference list on the monitor with the displayed program, so that the program can be studied and edited.

2. The method of claim 1, wherein the addresses are represented by symbols, and wherein the selecting step (a) comprises choosing a symbol representing the data element address.

3. The method of claim 2, wherein the choosing step comprises displaying a symbol list on the monitor and identifying the symbol representing the data element address therefrom.

4. The method of claim 3, wherein the identifying step further comprises selecting the symbol from the list of symbols displayed on the monitor by highlighting the symbol using a cursor-controlled movable highlighting element.

5. The method of claim 1, wherein the selecting step (a) comprises choosing a data element address by highlighting an instruction using the address using a cursor-controlled movable highlighting element.

6. The method of claim 1, wherein the cross-reference list further comprises a description of the selected address.

7. The method of claim 1, wherein the cross-reference list further comprises an indication of alternative uses of the selected address.

8. The method of claim 1, wherein the selecting step (c) comprises choosing a location from the cross-reference list displayed on the monitor by highlighting the location using a cursor-controlled movable highlighting element.

9. A method of navigating through a program for studying, debugging, modifying or developing the program, the program being stored in memory on a computer and comprising a plurality of instructions and a plurality of data elements each located at a particular address, each instruction being positioned at a location in the program and referencing at least one data element using the address for the element, the computer including means for displaying, editing and developing the program, the method comprising:
   (a) creating a cross-reference record for the instructions including the instruction's locations in the program and the data element addresses referenced by each of the instructions;
   (b) selecting a data element address rom the displayed program;
   (c) displaying a cross-reference list for the selected address on a monitor attached to the computer, the cross-reference list being generated from the cross-reference record and including locations in the program where instructions reference the selected address;
   (d) selecting a location from the cross-reference list displayed on the monitor; and
   (e) displaying a representation of the program on the monitor at the selected location in the program, so that the program can be studied or edited.

10. The method of claim 9, wherein the addresses are represented by symbols, and wherein the selecting step (b) comprises choosing a symbol representing the data element address.

11. The method of claim 10, wherein the choosing step comprises displaying a symbol list on the monitor and identifying the symbol representing the data element address therefrom.

12. The method of calm 11, wherein the identifying step further comprises selecting the symbol from the list of symbols displayed on the monitor by highlighting the symbol using a cursor-controlled movable highlighting element.

13. The method of claim 9, wherein the selecting step (b) comprises choosing a data element address by highlighting an instruction using the address using a cursor-controlled movable highlighting element.

14. The method of claim 9, wherein the cross-reference list further comprises a description of the selected address.

15. The method of claim 9, wherein the cross-reference list further comprises an indication of alternative uses of the selected address.

16. The method of claim 9, wherein the selecting step (d) comprises choosing a location from the cross-reference list displayed on the monitor by highlighting the location using a cursor-controlled movable highlighting element.

17. An apparatus for navigating through a program, the program being stored in memory on a computer and comprising a plurality of instructions and a plurality of data elements located at a particular address, each instruction referencing at least one data element using the address for the element, the apparatus comprising:
 (a) means for displaying the program;
 (b) means for selecting a data element address from the displayed program;
 (c) means for displaying a cross-reference list for the selected address on a monitor attached to the computer, wherein the cross-reference list comprises instruction types and instruction locations in the program which reference the selected address;
 (d) means for selecting a location from the cross-reference list displayed on the monitor; and
 (e) means for displaying the program on the monitor at the selected location in the program.

18. The apparatus of claim 17, wherein the addresses are represented by symbols, and wherein the means for selecting (a) comprises means for choosing a symbol representing the data element address.

19. The apparatus of claim 18, wherein the means for choosing comprises means for displaying a symbol list on the monitor and means for identifying the symbol representing the data element address therefrom.

20. The apparatus of claim 19, wherein the means for identifying further comprises means for selecting the symbol from the list of symbols displayed on the monitor by highlighting the symbol using a cursor-controlled movable highlighting element.

21. The apparatus of claim 17, wherein the means for selecting (a) comprises means for choosing a data element address by highlighting an instruction using the address using a cursor-controlled movable highlighting element.

22. The apparatus o claim 17, wherein the cross-reference list further comprises a description of the selected address.

23. The apparatus of claim 17, wherein the cross-reference list further comprises an indication of alternative uses of the selected address.

24. The apparatus of claim 17, wherein the means for selecting (c) comprises means for choosing a location from the cross-reference list displayed on the monitor by highlighting the location using a cursor-controlled movable highlighting element.

25. An apparatus for navigating through a program for studying, debugging, modifying or developing the program, the program being stored in memory on a computer and comprising a plurality of instructions and a plurality of data elements each located at a particular address, each instruction being positioned at a location and referencing at least one data element using the address for the element, the computer including means for displaying, editing and developing the program, the apparatus comprising:
 (a) means for creating a cross-reference record for the instructions, the cross reference record comprising the instruction locations in the program and the addresses being referenced by the instructions;
 (b) means for selecting a data element address from the displayed program;
 (c) means for displaying a cross-reference list for the selected address on a monitor attached to the computer, the cross-reference list being generated from the cross-reference record and including one or more locations in the program where instructions reference the selected address;
 (d) means for selecting a location from the cross-reference list displayed on the monitor; and
 (e) means for displaying a representation of the program o the monitor at the selected location in the program, so that the program can be studied or edited.

26. The apparatus of claim 25, wherein addresses are represented by symbols, and wherein the means for selecting (b) comprises means for choosing a symbol representing the data element address.

27. The apparatus of claim 26, wherein the means for choosing comprises means for displaying a symbol list on the monitor and means for identifying the symbol representing the data element address therefrom.

28. The apparatus of claim 27, wherein the means for identifying further comprises means for selecting the symbol from the list of symbols displayed on the monitor by highlighting the symbol using a cursor-controlled movable highlighting element.

29. The apparatus of claim 25, wherein the means for selecting (b) comprises means for choosing a data element address by highlighting an instruction using the address using a cursor-controlled movable highlighting element.

30. The apparatus of claim 25, wherein the cross-reference list further comprises a description of the selected address.

31. The apparatus of claim 25, wherein the cross-reference list further comprises an indication of alternative uses of the selected address.

32. The apparatus of claim 25, wherein the means for selecting (d) comprises means for choosing a location from the cross-reference list displayed on the monitor by highlighting the location using a cursor-controlled movable highlighting element.

* * * * *

UNITED STATES PATENT AND TRADEMARK OFFICE
CERTIFICATE OF CORRECTION

PATENT NO. : 5,267,145
DATED : November 30, 1993
INVENTOR(S) : Scott C. Zifferer et al.

It is certified that error appears in the above-identified patent and that said Letters Patent is hereby corrected as shown below:

Column 5, line 31, after "now", ".S." should read --U.S.--. Column 7, line 1, after "37","Search Addr:'" should read --"Search Addr:"--. Column 11, line 26, after "highlighting" strike "an"; line 45, after "location" "no" should read --on--. Column 12, line 28, after "address" change "rom" to --from--. Column 13, line 21, "(a)" should read --(b)--; line 37, after "apparatus" "o" should read --of--. Column 14, line 20, after "gram", "o" should read --on--; line 23, after "wherein" insert --the--.

Signed and Sealed this

Second Day of August, 1994

*Attest:*

BRUCE LEHMAN

*Attesting Officer*   Commissioner of Patents and Trademarks